United States Patent
Asai et al.

(10) Patent No.: US 7,782,493 B2
(45) Date of Patent: Aug. 24, 2010

(54) METHOD OF GENERATING THRESHOLD MATRIX FOR CREATING HALFTONE DOT IMAGE AND METHOD AND APPARATUS FOR CREATING HALFTONE DOT IMAGE AND RECORDING MEDIUM

(75) Inventors: Hiroshi Asai, Kyoto (JP); Masayuki Nakano, Kyoto (JP); Yasuhiro Takemoto, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 975 days.

(21) Appl. No.: 11/109,728

(22) Filed: Apr. 20, 2005

(65) Prior Publication Data

US 2005/0264834 A1 Dec. 1, 2005

(30) Foreign Application Priority Data

May 28, 2004 (JP) ............................. P2004-158595
Jan. 7, 2005 (JP) ............................. P2005-002777

(51) Int. Cl.
*H04N 1/405* (2006.01)

(52) U.S. Cl. ................ 358/3.19; 358/1.9; 358/3.01; 358/3.02; 358/3.09; 358/3.1; 358/3.11; 358/3.12; 358/3.13; 358/3.06; 358/3.2; 358/534; 358/536; 347/15; 345/596; 345/89

(58) Field of Classification Search .................. 358/1.9, 358/3.02, 3.06, 3.09–3.17, 3.19, 500; 382/237; 345/89, 596

See application file for complete search history.

(56) References Cited

U.S. PATENT DOCUMENTS 4,700,235 A * 10/1987 Gall ............................ 358/3.19

(Continued)

FOREIGN PATENT DOCUMENTS

CN 1044618 A 8/1990

(Continued)

OTHER PUBLICATIONS

Baqai et al., "Computer-Aided Design of Clustered-Dot Color Screens Based on a Human Visual System Model", Jan. 2002, Procedings of the IEEE, vol. 90, No. 1, pp. 104-122.*

(Continued)

*Primary Examiner*—Mark K Zimmerman
*Assistant Examiner*—Javier J Ramos
(74) *Attorney, Agent, or Firm*—McDermott Will & Emery LLP

(57) ABSTRACT

To generate a threshold matrix which is compared with an original image in creating a halftone dot image for each color component, in a matrix area for one color component, dot centers are arranged almost uniformly in a random fashion at a predetermined density and in a matrix area for another color component, dot centers are arranged almost uniformly in a random fashion at a density about 0.7 times the predetermined density. Then, threshold values are set so that dots should grow around the dot centers in accordance with an increase in gray level of the original image, to generate the threshold matrix for each color component. In creating the halftone dot images by using these threshold matrixes, characteristics of spatial frequency of the halftone dot images of these color components can be represented in a frequency space as areas (75K, 75C) in a shape of concentric rings. As a result, it is possible to create a multicolor halftone dot image with less graininess, with no portions approximate to each other in the characteristics of spatial frequency of these halftone dot images.

31 Claims, 17 Drawing Sheets

U.S. PATENT DOCUMENTS

| | | | |
|---|---|---|---|
| 5,859,955 A * | 1/1999 | Wang | 358/1.9 |
| 6,072,592 A * | 6/2000 | Ashworth | 358/1.9 |
| 6,606,168 B1 | 8/2003 | Rylander | |
| 6,714,320 B1 * | 3/2004 | Nakahara et al. | 358/3.13 |
| 6,853,467 B2 | 2/2005 | Waddle et al. | |
| 6,867,884 B1 * | 3/2005 | Rozzi | 358/1.9 |
| 6,956,670 B1 * | 10/2005 | Dittrich et al. | 358/1.9 |
| 2002/0051147 A1 * | 5/2002 | Asai | 358/1.9 |
| 2002/0051213 A1 * | 5/2002 | Yoshiaki | 358/296 |
| 2003/0169438 A1 * | 9/2003 | Velde et al. | 358/1.9 |
| 2003/0210431 A1 * | 11/2003 | Rylander | 358/3.06 |
| 2004/0090654 A1 * | 5/2004 | Minnebo et al. | 358/3.03 |
| 2004/0113921 A1 * | 6/2004 | Hains et al. | 345/611 |
| 2004/0160478 A1 * | 8/2004 | Weijkamp et al. | 347/43 |
| 2004/0223189 A1 * | 11/2004 | Bhattacharjya | 358/3.11 |
| 2004/0246288 A1 * | 12/2004 | Hara | 347/15 |
| 2005/0073591 A1 * | 4/2005 | Ishiga et al. | 348/223.1 |
| 2005/0243344 A1 * | 11/2005 | Tai et al. | 358/1.9 |
| 2006/0221400 A1 * | 10/2006 | Sugizaki | 358/3.13 |

FOREIGN PATENT DOCUMENTS

| | | |
|---|---|---|
| CN | 1424694 A | 6/2003 |
| EP | 726543 A2 * | 8/1996 |
| EP | 1 111 905 A2 | 6/2001 |
| EP | 1 458 178 A2 | 9/2004 |
| JP | 61-154364 | 7/1986 |
| JP | 63-56069 | 3/1988 |
| JP | 2905106 | 3/1999 |
| JP | 11-177821 | 7/1999 |
| JP | 2001-186346 | 7/2001 |
| JP | 2002-027250 | 1/2002 |
| JP | 2002-540735 | 11/2002 |
| JP | 3427026 | 5/2003 |
| WO | WO 90/08657 | 1/1990 |
| WO | WO 90/08657 | 8/1990 |
| WO | WO 01/86942 A1 | 11/2001 |
| WO | WO 02/065755 A1 | 8/2002 |
| WO | WO 03/028362 A1 | 4/2003 |

OTHER PUBLICATIONS

Secord, "Weighted Voronoi Stippling", Jun. 2002, ACM, Proceedings of the 2nd international symposium on Non-photorealistic animation and rendering, pp. 37-43.*

Anein et al, "New void-and-cluster method for improved halftone uniformity", Jan. 1999, Journal of Electronic Imaging, vol. 8(1), pp. 104-111.*

Ostromoukhov et al, "Stochastic clustered-dot dithering", Oct. 1999, Journal of Electronic Imaging, vol. 8(4), pp. 439-445.*

European Search Report issued in corresponding European Patent Application No. 05 00 8406, dated Feb. 26, 2007.

"Separate volume of "bit", Computational Geometry and Geographic Information Technology", supervised by Masao Iri, published by Kyoritsu Shuppan Co., Ltd., Sep. 10, 1986, pp. 163 to 168. (English translation is attached).

Kelvin Tritton "Stochastic screening", published by Pira International, Apr. 1991, pp. 84.

Japanese Office Action issued in Japanese Patent Application No. JP 2005-002777, dated Sep. 24, 2009.

* cited by examiner

METHOD OF GENERATING THRESHOLD MATRIX FOR CREATING HALFTONE DOT IMAGE AND METHOD AND APPARATUS FOR CREATING HALFTONE DOT IMAGE AND RECORDING MEDIUM

BACKGROUND OF THE INVENTION

1. Field of the Invention

The present invention relates to a technical field for creating a halftone dot image which represents an original image of gray scale.

2. Description of the Background Art

To create data for printing plate from data of an original image of gray scale (i.e., continuous tone), halftone dots are used in many cases. In a generally-used AM (Amplitude Modulated) screening, grayscale representation is made by changing the size of dots, instead of changing the number of dots constituting a halftone dot image. On the other hand, in an FM (Frequency Modulated) screening, grayscale representation is made by changing the number of dots of certain size, which are arranged appropriately (in a random fashion without extreme local difference in density). Further, as disclosed in Japanese Patent Publication No. 3427026 (Document 1), grayscale representation is made by changing the size of dots which are arranged in a random fashion.

In the AM screening, if the original image has periodicity, there may arise problems of causing an interference moire or causing an overlapping moire in multicolor printing. In general, if the halftone dots for two color components are superposed with their arrangement directions of dots being different at an angle of 30 (or 60) degrees, the overlapping moire is made less obvious. However, superposing the halftone dots for three color components, i.e., cyan, magenta and black, with their arrangement directions of halftone dots being different at an angle of, e.g., 15, 45 and 75 degrees from the horizontal direction causes a rosette pattern (moire pattern). In AM halftone dots, the overlapping moire becomes obvious as the difference in arrangement direction of dots is smaller. For example, if the difference in arrangement direction is 15 degrees, a 15 degree moire appears.

In FM halftone dots or halftone dots generated by the method disclosed in Document 1, no interference moire nor overlapping moire appears since the distances of dots are not uniform and the arrangement of dots has no directivity. In multicolor printing, however, the above halftone dots have tendency of making graininess more obvious.

It is thought that the graininess in a multicolor halftone dot image in which halftone dots for these color components arranged in a random fashion are superposed is caused by variation in overlapping dots due to the arrangement of dots without consideration of superposition of images of a plurality of color components (color separations), which is recognized as patterns of low frequency or color irregularity. As measures against the graininess, it can be thought that the density of dots should be made higher (the screen ruling should be made higher), but a writing with extremely fine dots may cause deterioration in stability of printing and make a swath pattern (a pattern appearing in a scan direction) of an output device more obvious in plate making. Then, it is thought preferable to reduce the graininess by preventing local overlapping of halftone dots for these color components.

For example, Published Japanese Translation of a PCT Application No. 2002-540735 (Document 2) discloses a method for making an effect of the positional difference in multicolor printing less obvious, where dots are arranged in a specific direction with pseudo-randomness obtained by using mathematical expressions and the directivity of dot arrangement is changed by colors. Japanese Patent Publication No. 2905106 (Document 3) discloses a method of reducing the graininess by controlling the arrangement of dots so that the overlapping of dots which are randomly arranged in the FM halftone dot should be reduced to as less as possible.

In the method of Document 2, since the pseudo-randomness is obtained by using mathematical expressions, there is a possibility that the interference moire may be caused if the original image has periodicity. On the other hand, in the method of reducing the graininess by controlling the arrangement of dots, an image with much less graininess can be obtained if registration (superposition of images of some color components) is correctly made, but there is a possibility that unexpected graininess may be caused by a slight misregistration which usually occurs in an actual printing. In other words, in this method of controlling the arrangement of dots, it is indispensable to ensure a strictly-correct registration and therefore the manufacturing cost of a printing apparatus disadvantageously increases.

The unnatural nonuniformity, such as graininess, printing irregularity, swath patterns or interference moire, which appears in a halftone dot image is liable to become more obvious in color separation of black than in color separations of cyan, magenta and yellow.

SUMMARY OF THE INVENTION

The present invention is intended for a method of generating a threshold matrix which is compared with an original image of gray scale for each color component in creating a halftone dot image which represents the original image, and it is an object of the present invention to easily generate a halftone dot image with less graininess, without causing any moire.

According to the present invention, the method of generating a threshold matrix comprises the steps of a1) arranging a plurality of first base points in a matrix area for a first color component almost in a random fashion at a predetermined density, a2) generating a threshold matrix for the first color component by setting threshold values in the matrix area for the first color component so that dot-like halftone dot areas grow from the plurality of first base points in a halftone dot image in accordance with an increase in gray level of a first original image, b1) arranging a plurality of second base points in a matrix area for a second color component almost in a random fashion at a certain density lower than the predetermined density and higher than half the predetermined density or higher than the predetermined density and lower than twice the predetermined density, and b2) generating a threshold matrix for the second color component by setting threshold values in the matrix area for the second color component so that dot-like halftone dot areas grow from the plurality of second base points in a halftone dot image in accordance with an increase in gray level of a second original image.

Preferably, the plurality of second base points are arranged in the matrix area for the second color component at a density not lower than 0.6 times the predetermined density and not higher than 0.9 times or not lower than 1.1 times the predetermined density and not higher than 1.9 times in the step b1).

Since the characteristics of spatial frequency of the halftone dot images created from the threshold matrix for the first color component and that of the halftone dot image created from the threshold matrix for the second color component have no portions similar to each other in the frequency space, it is possible to reduce graininess, without causing any moire in a multicolor halftone dot image which is created by superposing these halftone dot images.

According to an aspect of the present invention, the method further comprises the steps of c1) arranging a plurality of third base points in a matrix area for a third color component almost in a random fashion at a certain density lower than the predetermined density and higher than half the predetermined density or higher than the predetermined density and lower than twice the predetermined density, and c2) generating a threshold matrix for the third color component by setting threshold values in the matrix area for the third color component so that dot-like halftone dot areas grow from the plurality of third base points in a halftone dot image in accordance with an increase in gray level of a third original image, and in the method of the present invention, the density of the plurality of second base points and the density of the plurality of third base points are almost equal to each other, and intervals of the plurality of first base points are isotropic, intervals of the plurality of second base points are smallest in a first direction and intervals of the plurality of third base points are smallest in a second direction different from the first direction.

By the present method, in superposing halftone dot images of three colors or more, it is possible to reduce graininess in the multicolor halftone dot image while preventing a large difference in screen ruling among the single-color halftone dot images.

The present invention is also intended for a method and an apparatus for creating a halftone dot image using the threshold matrix for each color component generated by the above method, and a recording medium carrying threshold matrixes generated by the above method.

The present invention is further intended for a method of creating a halftone dot image not depending on whether the threshold matrix is used or not.

According to another aspect of the present invention, the method comprises the steps of creating a first halftone dot image in which the size of a plurality of dots for a first color component is changed around a plurality of first base points arranged almost in a random fashion at a predetermined density, in accordance with the gray level of a first original image, and creating a second halftone dot image in which the size of a plurality of dots for a second color component is changed around a plurality of second base points arranged almost in a random fashion at a certain density lower than the predetermined density and higher than half the predetermined density or higher than the predetermined density and lower than twice the predetermined density, in accordance with the gray level of a second original image.

According to still another aspect of the present invention, the method comprises the steps of creating a first halftone dot image in which first density in the number of dots for a first color component which are arranged almost uniformly in a random fashion is changed in accordance with the gray level of a first original image, and creating a second halftone dot image in which second density in the number of dots for a second color component which are arranged almost uniformly in a random fashion is changed in accordance with the gray level of a second original image, and in the method of the present invention, the second density is lower than the first density and higher than half the first density or higher than the first density and lower than twice the first density in each gray level.

Thus, the technique for reducing graininess in a multicolor halftone dot image by changing the density in the number of dots by color components can be applied to various methods of creating a halftone dot image in which dots are arranged in a random fashion.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
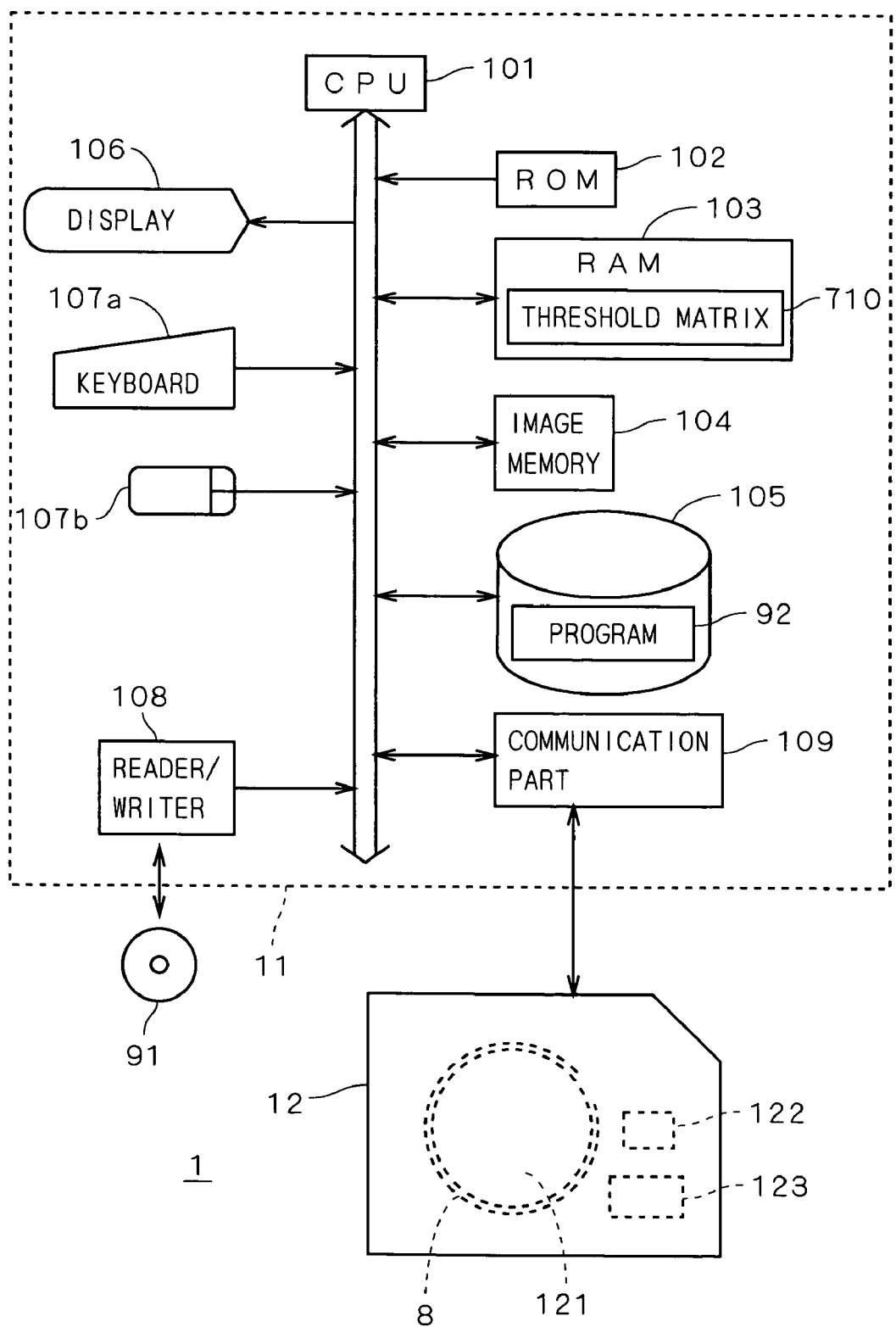
FIG. 1 is a view showing a constitution of an image recording system.

FIG. 1 is a view showing a constitution of an image recording system 1 in accordance with a preferred embodiment of the present invention. The image recording system 1 comprises a computer 11 and an image recording apparatus 12, and the image recording apparatus 12 receives a signal from the computer 11 and records halftone dots on a printing plate serving as a halftone dot recording medium by using light beams from a multichannel laser or the like. The image recording apparatus 12 may be a printing apparatus of another recording mode such as an electrophotographic or ink-jet printing apparatus using a photosensitive drum or printing paper as the halftone dot recording medium.

The computer 11 has a constitution of general computer system where a CPU 101 for performing various computations, a ROM 102 for storing a basic program and a RAM 103 for storing various information are connected to a bus line. To the bus line, an image memory 104 for storing data of a grayscale image of a plurality of color components (hereinafter, referred to as "original image") to be represented by halftone dots (screening), a fixed disk 105 for storing information, a display 106 for displaying various information, a keyboard 107a and a mouse 107b for receiving an input from an operator, a reader/writer 108 for reading information from a computer-readable recording medium 91 such as an optical disk, a magnetic disk or a magneto-optic disk and writing information into the recording medium 91, and a communication part 109 for making communications with the image recording apparatus 12 are further connected through an interface (I/F) as appropriate.

The image recording apparatus 12 comprises a drum 121 holding a printing plate 8 on its side surface, a writing head 122 for outputting light beams which are modulated in multichannel towards the printing plate 8, a signal generation circuit 123 for generating a signal of halftone dot image to be transmitted to the writing head 122, a driving mechanism for scanning the writing head 122 with respect to the printing plate 8 by rotating the drum 121 and moving the writing head 122 along a rotation axis of the drum 121, and the like. In the following discussion, "pixel" refers to one unit for recording (writing) in the image recording apparatus 12 and corresponds to one spot by one light beam.

In the computer 11, a program 92 is read out from the recording medium 91 through the reader/writer 108 in advance and stored in the fixed disk 105. Then, the program 92 is copied in the RAM 103 and the CPU 101 performs a computation according to the program 92 in the RAM 103 (that is, the computer 11 executes the program), by which the computer 11 generates a threshold matrix (also referred to as "SPM (Screen Pattern Memory) data) 710 for each color component to be used for formation of halftone dots, which is discussed later. The threshold matrix 710 and the data of the original image of gray scale stored in the image memory 104 are transmitted to the image recording apparatus 12 through the communication part 109, the signal generation circuit 123 in the image recording apparatus 12 generates a signal of halftone dots for one color component used to represent the original image and the halftone dots are recorded on the printing plate 8 on the basis of the halftone signal while the writing head 122 is scanned with respect to the printing plate 8.

In the image recording system for creating a halftone dot image, recording the halftone dots on the printing plate 8 may be regarded as a (physical) formation of the halftone dot image, and generation of the signals for the halftone dots may be regarded as a (nonphysical) formation of the halftone dot image. The generation of the signal for the halftone dots may be performed by software with the computer 11 and in this case, the computer 11 solely forms the halftone dot image on the basis of the original image.

Figure 2:
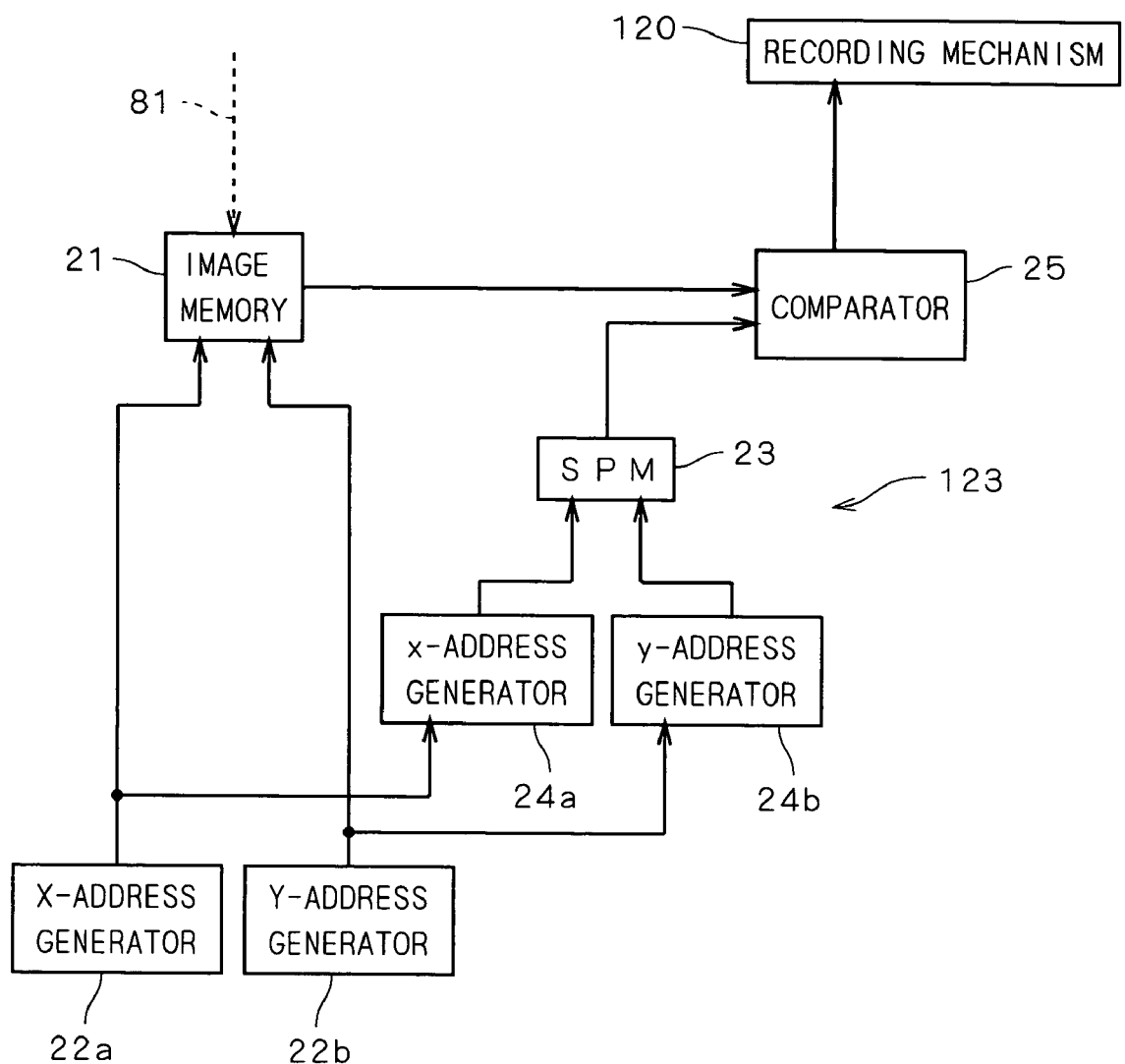
FIG. 2 is a block diagram showing a signal generation circuit and a recording mechanism.

FIG. 2 is a block diagram showing constituent elements of the signal generation circuit 123 in the image recording apparatus 12 and a recording mechanism 120. The recording mechanism 120 corresponds to the drum 121, the writing head 122, a mechanism for driving these elements, a circuit for controlling these elements or the like.

The signal generation circuit 123 comprises an image memory 21 for storing data of the original image of gray scale, an X-address generator 22a and a Y-address generator 22b for generating a subscan address (X address) and a main scan address (Y address) of the original image, respectively, an SPM (Screen Pattern Memory) 23 for storing the threshold matrix 710 generated by the computer 11, an x-address generator 24a and a y-address generator 24b for generating a subscan address (x address) and a main scan address (y address) of the threshold matrix 710, respectively, and a comparator 25.

Figure 3:
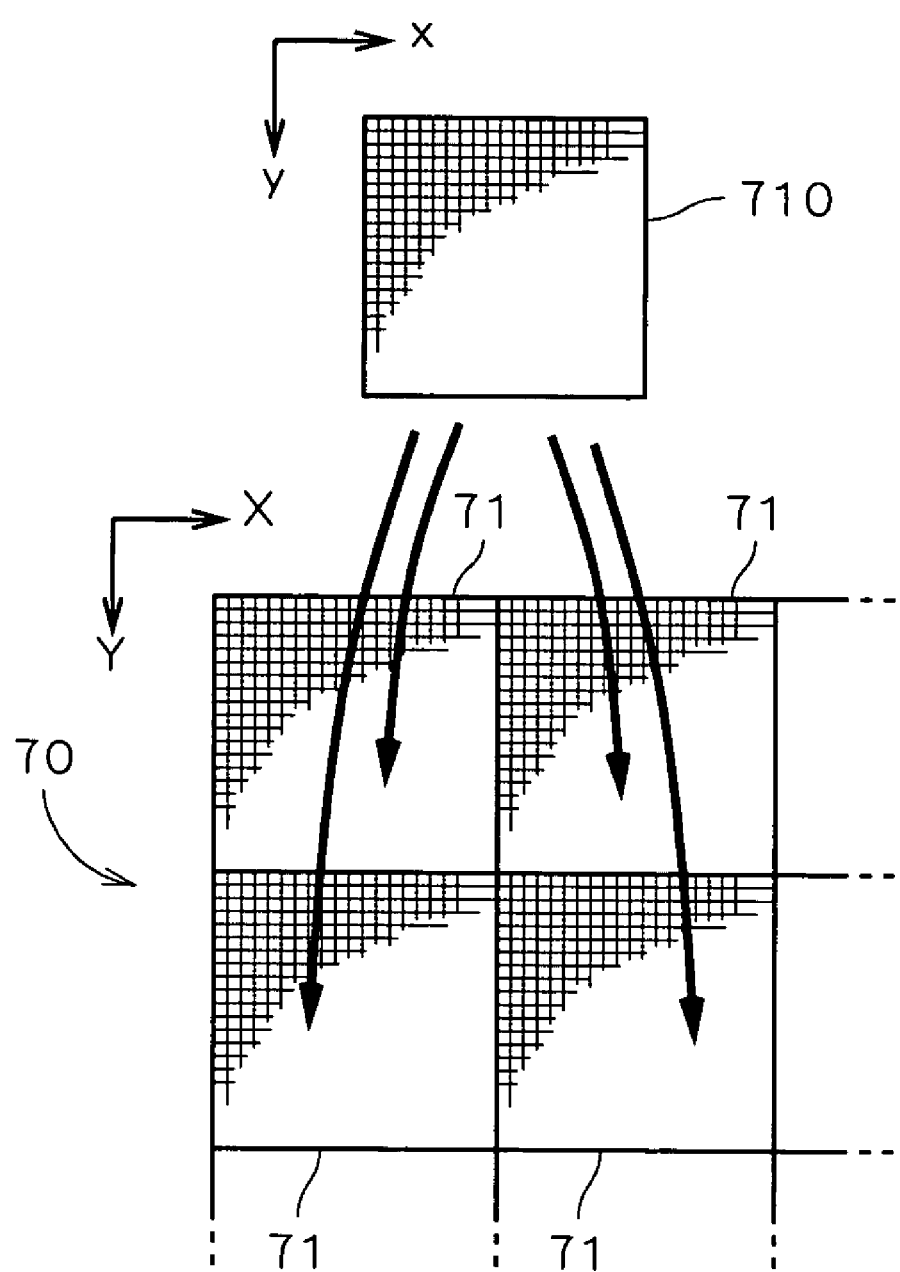
FIG. 3 is a view showing repeat areas and a threshold matrix.

In creating halftone dots of the original image, as shown in FIG. 3, the original image 70 is divided into a lot of areas having the same size to set repeat areas 71 each serving as a unit for creation of halftone dots. The SPM 23 has a storage area for one color component that corresponds to one repeat area 71, and sets a threshold value for each address (coordinates) of the storage area to store the threshold matrix 710. Then, conceptually, the repeat area 71 of the original image 70 and the threshold matrix 710 are superposed and the gray level of each pixel in the repeat area 71 is compared with a corresponding threshold value in the threshold matrix 710, to thereby determine whether writing should be performed on the position of the pixel on the halftone dot recording medium or not. Therefore, if the gray level of the original image 70 is uniform, writing is performed on a pixel having an address where a threshold value smaller than the gray level is set in the threshold matrix 710 and macroscopically, uniform halftone dots are generated. Actually, since the original image 70 has gradation (i.e., portions having various gray levels), the halftone dots vary in the repeat area 71 in accordance with the gradation in the original image 70. Thus, the threshold matrix 710 is used for creation of the halftone dot image representing the original image of gray scale, through comparison with the original image. The comparison between the threshold matrix 710 and the original image is performed for each color component.

Specific discussion will be made on creation of halftone dots, referring to FIG. 2. The gray level (for a specific color component) of one pixel in the original image is read out from the image memory 21 on the basis of an X address and a Y address from the X-address generator 22a and the Y-address generator 22b, respectively. On the other hand, an x address and a y address in the repeat area corresponding to the X address and the Y address in the original image are obtained by the x-address generator 24a and the y-address generator 24b, respectively, and one threshold value in the threshold matrix 710 is thereby specified and read out from the SPM 23. The comparator 25 compares the gray level from the image memory 21 with the threshold value from the SPM 23, and when the gray level is larger than the threshold value, a signal to indicate that writing should be performed on the position of the pixel is generated.

When the original image is a multicolor image, a color component specifying signal 81 indicating the color component of the halftone dot image to be recorded is inputted to the image memory 21, and at this time, the threshold matrix 710 to be recorded in the SPM 23 is replaced with one for the specific color component.

Figure 4:
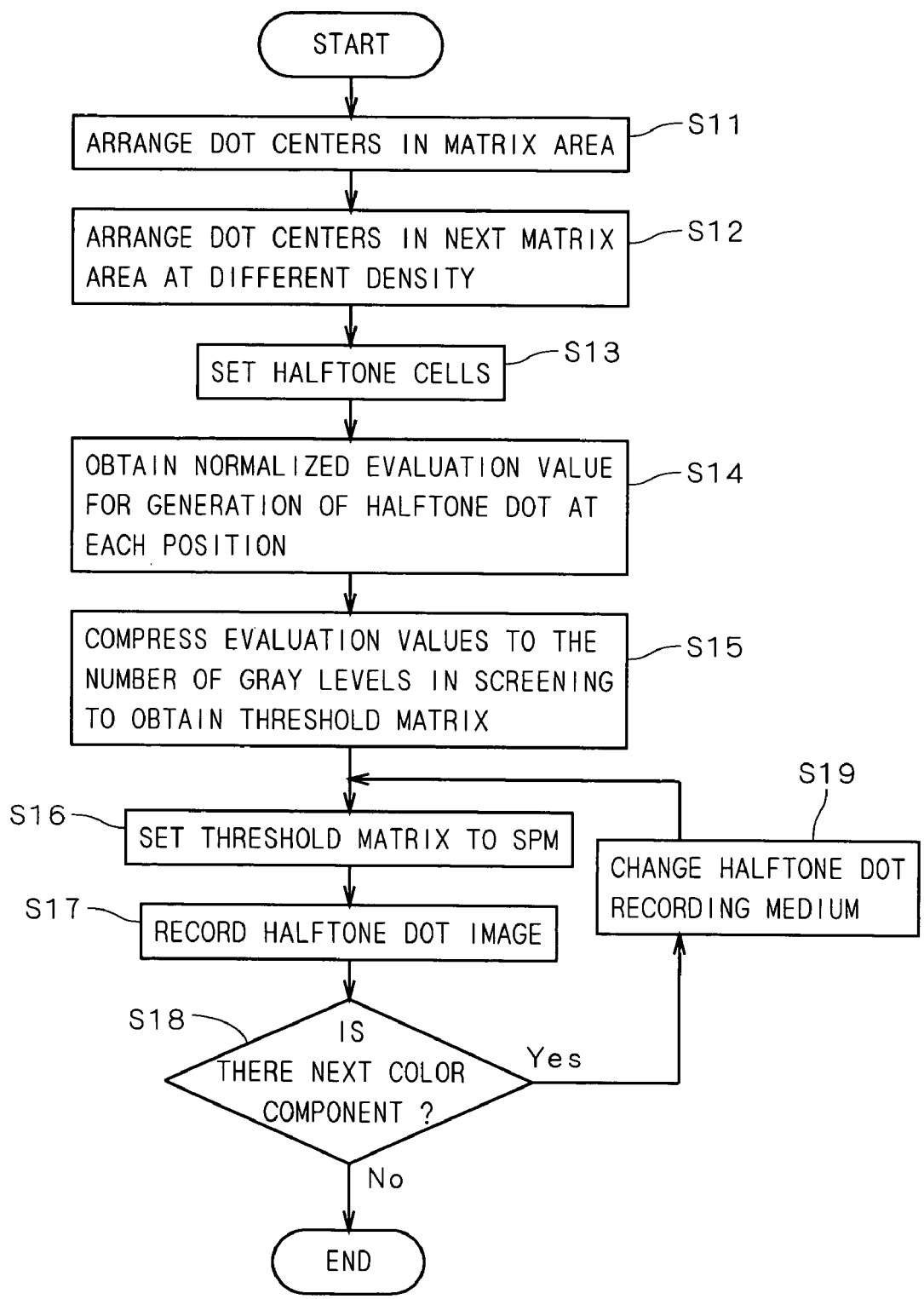
FIG. 4 is a flowchart showing an operation flow of the image recording system.
Figure 5:
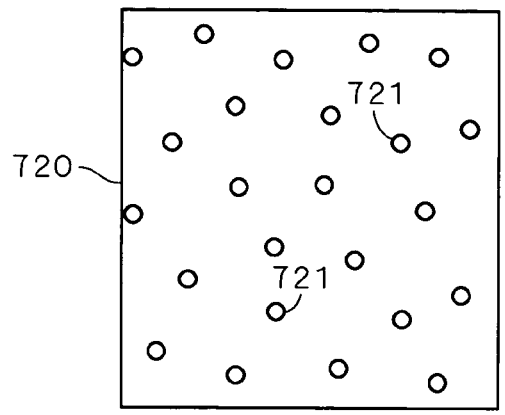
FIG. 5 is a view showing a matrix area in which dot centers are arranged.

FIG. 4 is a flowchart showing an operation flow of the image recording system 1. In recording the halftone dots on the printing plate 8 by the image recording system 1, first, the computer 11 sets a matrix area for storing the threshold matrix 710 and centers of halftone cells (each of which is a base point (seed) for generation of the threshold matrix corresponding to the almost central position of a dot used to represent the halftone dot image and hereinafter referred to as "dot center") each serving as a unit of an area for forming the halftone dots are arranged almost uniformly in a random fashion in the matrix area (Step S11). FIG. 5 is a view showing the matrix area 720 in which dot centers 721 are arranged. Actually, so many dot centers 721 are arranged in the matrix area 720.

In the arrangement of the dot centers 721, first, evaluation values are associated with all the positions (which are specifiable (addressable) by coordinate values) in the matrix area 720 and all the evaluation values are initialized to 0. The first dot center 721 is placed at random in the matrix area 720 and the reciprocal of the square of the distance between each position and the first dot center 721 is added to the evaluation value corresponding to the position. At this time, since the matrix area 720 corresponds to the repeat area 71 shown in FIG. 3, the first dot center 721 which is an object for calculation of the evaluation value is thought to be repeated both in the horizontal and vertical directions. In other words, in calculation of the evaluation value selected is one out of a plurality of first dot centers 721 when the matrix area 720 is assumed to repeat, which is closest to a position used as a distance calculation reference.

After the evaluation values for all the positions are obtained, a second dot center 721 is placed at a position associated with the smallest one of the evaluation values. In other words, the second dot center 721 is placed at the position farthest from the first dot center 721. Next, the reciprocal of the square of the distance between each position and the second dot center 721 (the closest one out of a plurality of second dot centers 721 when the matrix area 720 is assumed to repeat) is added to the corresponding evaluation value. Then, a third dot center 721 is placed at a position associated with the smallest evaluation value. If there are a plurality of positions to become a location candidate for the dot center 721, however, one of them is appropriately selected.

After that, the reciprocal of the square of the distance between each position in the matrix area 720 and the last-placed dot center 721 (assuming that the matrix area 720 is repeated) is added to the corresponding evaluation value, and the next dot center 721 is placed at a position associated with the smallest evaluation value. With this operation, the next dot center 721 is placed at a position farthest from any one of the dot centers 721, and thus the dot centers 721 are arranged almost uniformly in a random fashion.

The arrangement of the dot centers 721 may be performed by other methods only if the dot centers 721 can be arranged almost uniformly in a random fashion. For example, in the above method, a plurality of dot centers 721 may be arranged as the first dot centers. There may be an alternative method for arranging the dot centers 721 in the matrix area 720 where a plurality of dot centers 721 are aligned in the matrix area 720 and these dot centers 721 are moved by random distances within a certain range in random directions.

As another method, the dot centers 721 which are arranged in a random fashion may be rearranged almost uniformly by utilizing a solution of facility location problem using Voronoi diagrams. The facility location problem is a nonlinear optimization problem for determining location of a plurality of facilities in a two-dimensional space so that the total of expenditures to be used by a lot of users who are present in the two-dimensional space to utilize the facilities should become a minimum value. In this case, the evaluation function used to obtain the "expenditures" is, e.g., a distance between a user and each facility. The Voronoi diagram is described in detail in "separate volume of "bit", Computational Geometry and Geographic Information Technology", supervised by Masao Iri, published by Kyoritsu Shuppan Co., Ltd., Sep. 10, 1986, pp. 163 to 168.

When the arrangement of the dot centers 721 in the matrix area 720 for one color component is completed, the arrangement of the dot centers 721 in the matrix area 720 for the next color component is performed almost uniformly in a random fashion (Step S12). Usually, the arrangement of the dot centers 721 is performed for three color components or more, but the following discussion will be made assuming that the arrangement is performed for two color components and the dot centers 721 for cyan are arranged in Step S11 and those for black are arranged in Step S12.

The density of the dot centers 721 for black is about 0.7 times that of the dot centers 721 for cyan. For example, if the halftone dots are recorded by the image recording apparatus 12 having a resolution of 2400 dpi (the width of one pixel is about 10 μm) under the condition that the screen ruling (halftone dot density) for cyan is 300 and the matrix area 720 has a size of 800×800 pixels, an area allocated to one halftone dot has about 64 (8×8) pixels and in Step S11, the dot centers 721 are added until the number of dot centers 721 which are included in the matrix area 720 becomes 10000. In this case, for black, the screen ruling (halftone dot density) is 210 (300×0.7), and an area allocated to one halftone dot has about 131 (11.4×11.4) pixels and in Step S12, the dot centers 721 are added until the number of dot centers 721 which are included in the matrix area 720 becomes 4925. Discussion will be made later on the reason why the density of the dot centers 721 for black is about 0.7 times that of the dot centers 721 for cyan.

Figure 6:
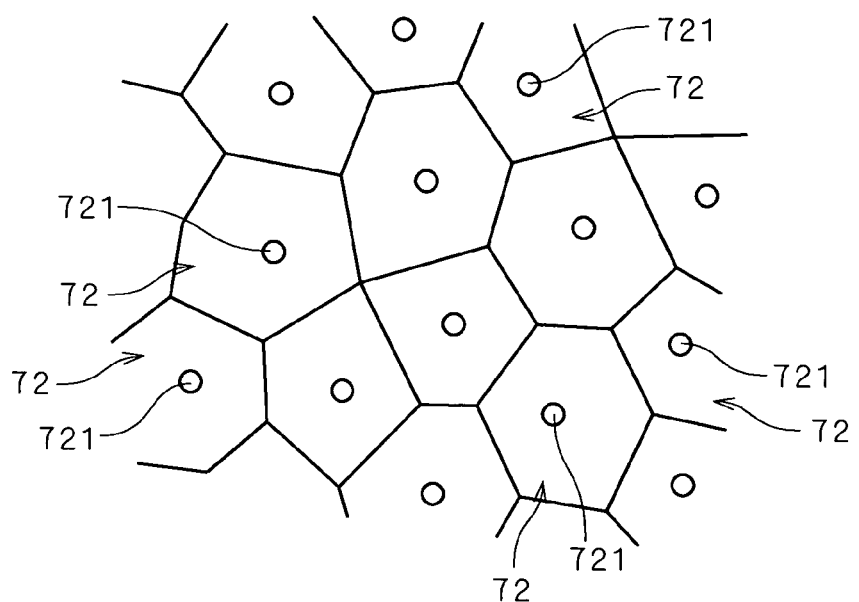
FIG. 6 is a view showing halftone cells which are set.

When the arrangement of the dot centers 721 in the matrix area 720 is completed, setting of the halftone cells around the dot centers 721, respectively, each of which serves as a unit for generation of the halftone dot, is performed for each color component (Step S13). Specifically, though FIG. 4 shows the setting of the halftone cells as one step, i.e., Step S13, Step S13 is a step collecting a plurality of same steps for a plurality of color components. FIG. 6 is a view showing a state where polygonal halftone cells 72 are set around the dot centers 721, respectively, for one color component. The halftone cells 72 are set in consideration of repeat of the matrix area 720 both in the horizontal and vertical directions.

The setting of the halftone cells is performed, for example, in the following manner. First, in order to determine which one of the dot centers 721 a pixel at a position in the matrix area 720 belongs to, the square of the distance between the pixel and each dot center 721 is obtained as an evaluation value. In calculation of the evaluation value for one dot center 721 (hereinafter, referred to as "specified dot center"), one out of a plurality of specified dot centers in consideration of repeat of the matrix area 720 both in the horizontal and vertical directions, which is closest to the specified pixel, is selected as an object for calculation of the evaluation value. Then, it is determined that this pixel should belong to the dot center 721 which has the smallest evaluation value. By performing the above calculation for all the pixels, the matrix area 720 is divided into halftone cells 72 around the dot centers 721.

When the setting of the halftone cells 72 is completed, generation of the threshold matrix is further performed by the computer 11 (Steps S14 and S15).

Generation of the threshold matrix is performed for each color component, and Steps S14 and S15 in FIG. 4 are steps collecting a plurality of same steps for a plurality of color components. In the generation of the threshold matrix, first, a first-stage evaluation value is obtained for each of all the pixels in each halftone cell 72. As the first-stage evaluation value, for example, the distance between the pixel and the dot center 721 of the halftone cell 72 including the pixel or the distance between the pixel and the barycenter of the halftone cell 72 is used. If the distance between the pixel and the barycenter of the halftone cell 72 is used as the first-stage evaluation value, it is thought that the dot center 721 should be reset to the barycenter of the halftone cell 72 at this time. Then, numbers of integer which increase by 1 are sequentially assigned to all the pixels in each halftone cell 72, from one having the smallest first-stage evaluation value, and the number is divided by the number of pixels constituting the halftone cell 72, to obtain a second-stage evaluation value (ranging from 0.0 to 1.0) which is normalized by the size of the halftone cell, which is now assigned. This allows a smaller evaluation value to be assigned to a pixel closer to the dot center 721 (or the barycenter of the halftone cell 72) (Step S14).

Further, numbers of integer which increase by 1 (the order of pixels on which writing is performed in accordance with an increase in gray level of the original image, i.e., the lighting order in exposure) are sequentially assigned to all the pixels in the matrix area 720, from one having the smallest second-stage evaluation value, and reduction of gray levels is performed in accordance with the number of gray levels in screening (equal to the number of gray levels for each color component in the original image in this preferred embodiment) and the final threshold value is thereby assigned to each pixel, to generate the threshold matrix 710 corresponding to the matrix area 720 (see FIG. 1) (Step S15). When the number of pixels in the matrix area 720 is M and the number of gray levels for each color component in the original image is N (typically, 256 (=8 bit)), for example, the number (0 to (M−1)) assigned to each pixel is multiplied by ((N−1)/(M−1)), being corrected to an integer number, to assign the threshold value ranging from 0 to (N−1) to the pixel. With this operation, the threshold values are set so that the dots should grow around the dot centers 721 in accordance with an increase in gray level of the original image for each color component, and a plurality of threshold matrixes 710 corresponding to a plurality of color components are generated.

Figure 7A:
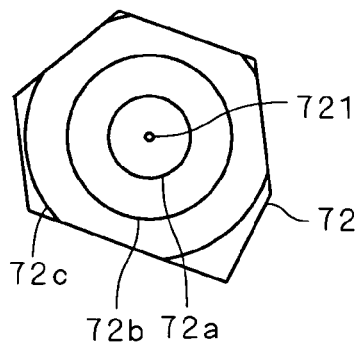
FIGS. 7A to 7C are views showing exemplary changes in size of dot.

FIG. 7A is a view showing variation in size of the dot (a set of pixels to which writing is performed) to be written in the halftone cell 72 in accordance with variation in gray level of the original image, and areas 72a to 72c represent a dot which grows in accordance with the increase in gray level of the original image. In FIG. 7A, since the first-stage evaluation value for each pixel is obtained as the distance between the pixel and the dot center 721 in Step S14, the areas 72a to 72c each have a circular shape.

Figure 7B:
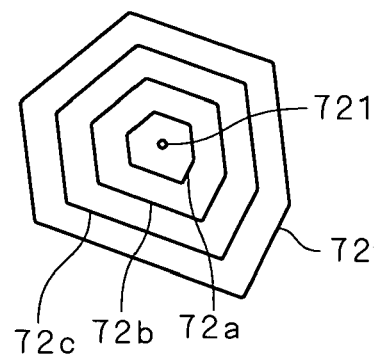
Figure 7C:
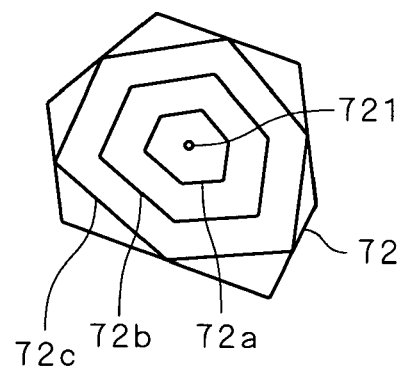

FIGS. 7B and 7C are views showing other exemplary growths of the dot, and the same reference signs as in FIG. 7A are used. In FIG. 7B, as the first evaluation value in Step S14 used is a ratio between the distance from the dot center 721 to the pixel which is an object for calculation of the first evaluation value and the distance from the dot center 721 to an edge of the halftone cell 72 on a line connecting the dot center 721 and the pixel. In FIG. 7C, an inside polygon formed by connecting midpoints of sides of a polygonal halftone cell is set, and as the first evaluation value used is a ratio between the distance from the dot center 721 to the pixel and the distance from the dot center 721 to an edge of the inside polygon on a line connecting the dot center 721 and the pixel. In this figure, in areas between the inside polygon and the edge of the halftone cell 72, the first evaluation values which increase towards vertices of the halftone cell 72 are appropriately set.

As shown in FIGS. 7A to 7C, in the matrix area, the threshold values are set so that dot-like halftone dot areas should grow from a plurality of dot centers 721 in a halftone dot image in accordance with the shape of the halftone cell 72 (in other words, within the range of the halftone cell) with an increase in gray level in the original image, and the threshold matrix is thereby generated.

When generation of the threshold matrix 710 is completed by the computer 11, the threshold matrix 710 for one color component and the data of the original image stored in the image memory 104 are transmitted to the image recording apparatus 12 through the communication part 109 and stored into the SPM 23 and the image memory 21 shown in FIG. 2, respectively, as discussed earlier. With this operation, a group of threshold values corresponding to the growth of the halftone dot of each halftone cell 72 is set in a storage area having the same size as the matrix area 720 in the SPM 23 (Step S16).

Then, the gray level of each pixel for one color component in the original image stored in the image memory 21 and the corresponding threshold value in the threshold matrix 710 in the SPM 23 are inputted to the comparator 25, the signal generation circuit 123 in the image recording apparatus 12 generates a signal of halftone dot image and the writing head 122 records the halftone dot image of one color component on the printing plate 8 (Step S17). Specifically, when the gray level of the pixel in the original image is larger than the threshold value, light is emitted to a position of the printing plate 8 corresponding to the pixel by the recording mechanism 120, to thereby perform writing.

If image recording for the next color component is required (Step S18), the image recording medium is replaced with a new one (Step S19), the color specifying signal 81 is inputted to the image memory 21 as shown in FIG. 2, the threshold matrix 710 in the SPM 23 is replaced with one for the next color component and the halftone dot image of the next color component is recorded on the halftone dot recording medium.

Figure 8A:
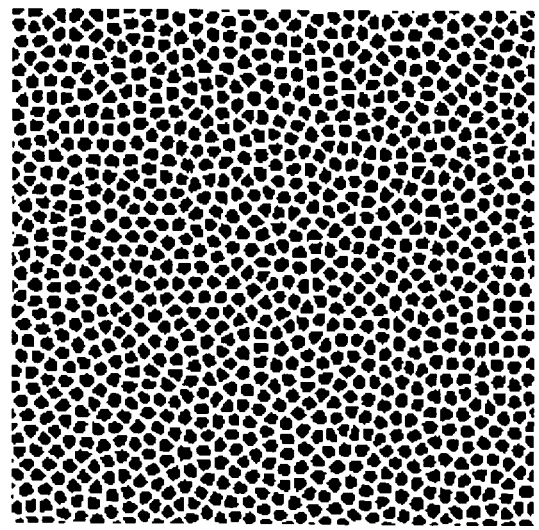
FIGS. 8A and 8B are views each showing a halftone dot image of one color component in a comparison example.
Figure 8B:
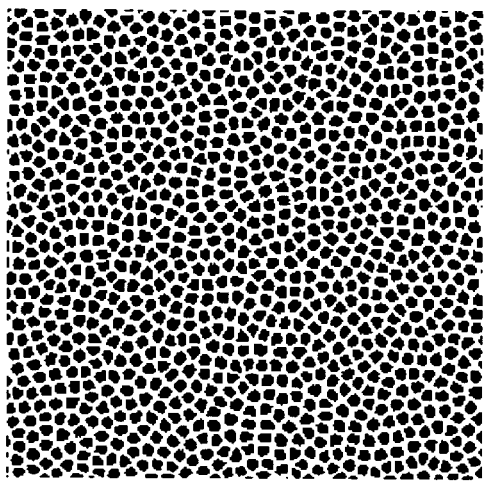
Figure 8C:
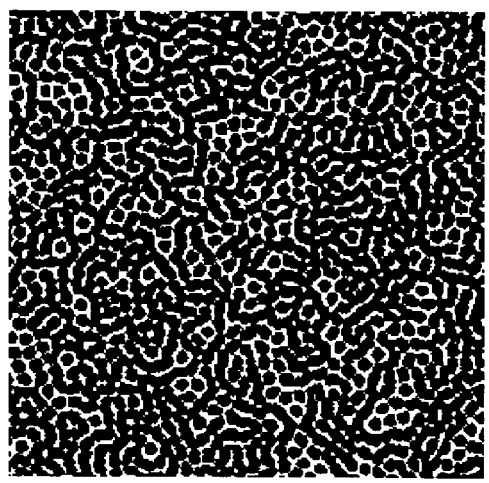
FIG. 8C is a view showing an image in which the halftone dot images of two color components in the comparison example are superposed.
Figure 9A:
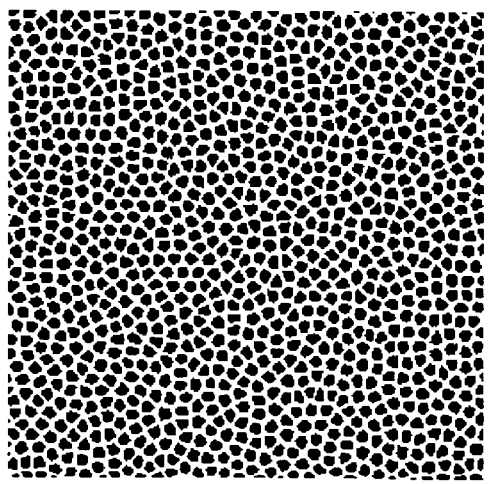
FIGS. 9A and 9B are views each showing a halftone dot image of one color component in the image recording system.
Figure 9B:
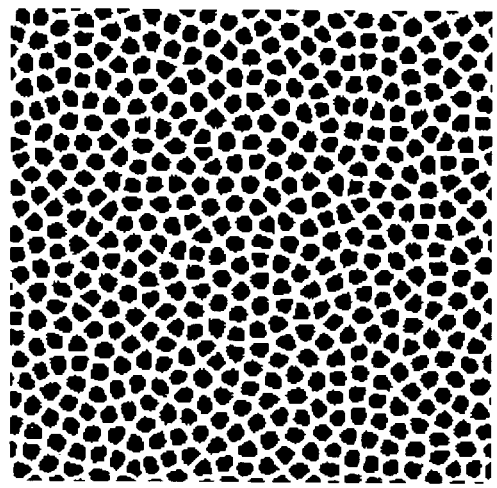
Figure 9C:
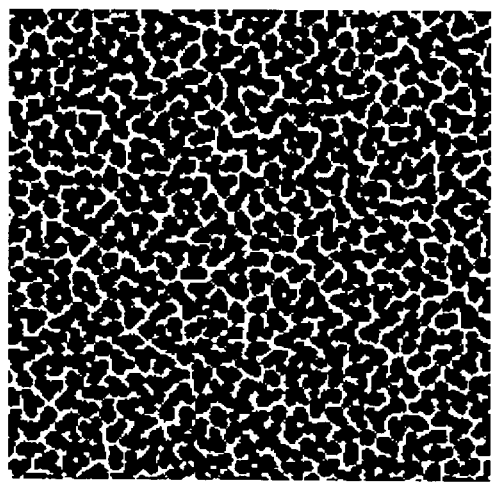
FIG. 9C is a view showing an image in which the halftone dot images of two color components in the image recording system are superposed.

FIGS. 8A to 8C are views showing exemplary halftone dot images which are created in a case (comparison case) where the dot centers 721 are arranged in a random fashion at the same density in the matrix areas 720 for two color components, and FIGS. 9A to 9C are views showing exemplary halftone dot images which are created by arranging the dot centers 721 for cyan and black at different densities in the image recording system 1 as discussed earlier.

FIGS. 8A and 9A show the halftone dot images of cyan (in binary representation of white and black) in a case where the gray level of cyan in the original image is uniformly 50%, and FIGS. 8B and 9B show the halftone dot images of black in a case where the gray level of black in the original image is uniformly 50%. FIG. 8C shows an image obtained by superposing the images of FIGS. 8A and 8B and FIG. 9C shows an image obtained by superposing the images of FIGS. 9A and 9B. In these figures, instead of discriminating cyan and black, binary representation of white and black is made. As shown in FIG. 8C, in superposition of the images, there arises a low-frequency irregularity structure in which some areas where halftone dots are overlapped and the other areas where halftone dots are not overlapped are distributed irregularly, even though the local difference in density is not recognizable in a signal color. As a result, the areas where the halftone dots are overlapped are slightly recognized as white blocks and the other areas where the halftone dots are not overlapped are recognized as dark blocks, and this irregular light and shade is sensed as graininess. On the other hand, as can be seen from comparison between FIGS. 8C and 9C, when the density of the dot centers 721 is changed by color components, it is possible to suppress irregularity of light and shade and therefore possible to easily create a halftone dot image with less graininess, without causing any moire.

Next discussion will be made on the principle that the graininess is reduced by changing the density of the dot centers 721 by color components.

In general, when the characteristic of spatial frequency (spectrum) of the AM halftone dot is represented in a two-dimensional frequency space, since the AM halftone dot has periodicity in a specific direction, there appears a high value representing periodicity in a local area inside the frequency space. If the arrangement direction of halftone dots for one color component is the same as that of halftone dots for another color component and the respective distances between dots are approximate to each other, a local area which appears as the characteristic of spatial frequency of halftone dots for one color component (hereinafter, referred to simply as "characteristic of frequency for one color component") and a local area which appears as the characteristic of frequency for another color component become close to each other. Then, as these local areas become closer, there arises an unpleasant overlapping moire having longer (lower-frequency) pitch. In other words, as the characteristics of frequency for these color components are closer to each other, there appears more unpleasant moires.

Figure 10A:
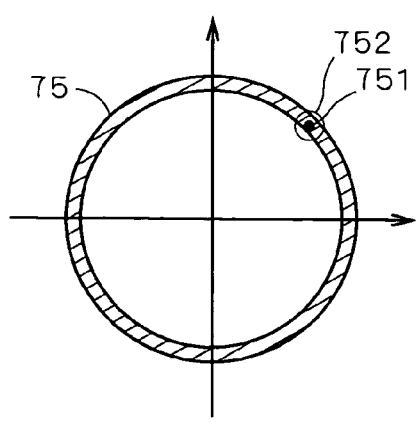
FIG. 10A is a view showing a characteristic of spatial frequency of halftone dots in the comparison example.

On the other hand, if the halftone dots are arranged almost uniformly in a random fashion, since the periodicity has isotropic property, when the characteristic of spatial frequency of halftone dots is represented in a two-dimensional frequency space, high values representing periodicity are distributed in a ring-like area 75 around the point of origin as shown in FIG. 10A. If the characteristics of frequency for two color components appear as the same ring-like area 75, paying attention to a given point 751 included in the distribution representing the characteristic of frequency for one color component, a portion included in the vicinity of the point 751 (for example, a portion included in an area 752 around the point 751) is inevitably present in the distribution representing the characteristic of frequency for another color component. In other words, part of the characteristic of frequency for one color component and part of the characteristic of frequency for another color component are equivalent or approximate, and these cause an unpleasant low-frequency pattern to give graininess to the halftone dot image obtained by superposition.

Figure 10B:
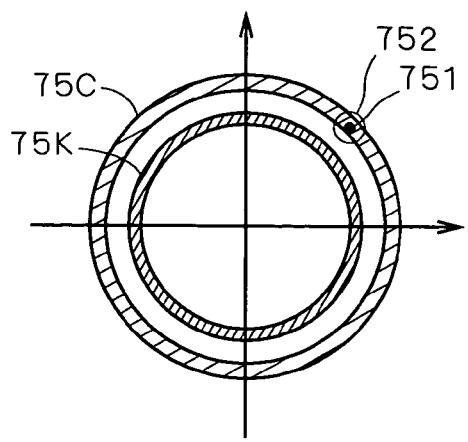
FIG. 10B is a view showing a characteristic of spatial frequency of halftone dots in the image recording system.

In the image recording system 1, the density of dot centers 721 for black is about 0.7 times the density of the dot centers 721 for cyan. Therefore, when the characteristics of frequency for these color components are represented in a frequency space, double concentric rings appear as shown in FIG. 10B. In FIG. 10B, an outer area 75C corresponds to the halftone dots for cyan having high spatial frequency and an inner area 75K corresponds to the halftone dots for black having low spatial frequency.

In FIG. 10B, paying attention to the given point 751 in the area 75C, the area 752 in the vicinity of the point 751 and the area 75K for black are not overlapped. In other words, the characteristic of spatial frequency of the halftone dots for cyan and that of the halftone dots for black have no similar portion. As a result, in a halftone dot image obtained by superposing the images of these color components, no unpleasant low-frequency pattern is caused and graininess is reduced.

As discussed above, however, in the method where dots for each color component are arranged in a random fashion (to some degree) in consideration for prevention of graininess in superposition of the halftone dot images of different color components, misregistration of the halftone dot images of different color components causes unexpected graininess in a multicolor halftone dot image. On the other hand, in the image recording system 1, since the graininess is reduced by changing the density of the dot centers 721 arranged in a random fashion by color components, it is possible to easily suppress the unexpected graininess even if there is misregistration in the multicolor halftone dot image.

Though the above discussion has been made on the image recording system 1, taking the case where the multicolor halftone dot image is constituted of two color components, cyan and black, as an example, in many cases, the color components of halftone dot image include four colors, i.e., cyan, magenta, yellow and black. In this case, since the color component which affects most the contrast of the halftone dot image is black, the halftone dot density for black (the density of dots on the highlight side) is about 0.7 times the halftone dot density for other color components. Naturally, the halftone dot density for other color components may be about 0.7 times the halftone dot density for black (in other words, the halftone dot density for black is relatively about 1.3 times the halftone dot density for other color components). In another case of halftone dot image without black, since cyan and magenta affect the contrast, the halftone dot density for either cyan or magenta is about 0.7 times the halftone dot density for the other color component.

Since the size of the dot-like halftone dot area in the same gray level can be made larger for the color component having lower halftone dot density, it is also possible to improve the printing stability and reduce the swath pattern (striped moire appearing in a main scan direction in writing). Therefore, by reducing the halftone dot density for black whose concentration of ink is high, it is possible to improve the printing stability and reduce the swath pattern.

Next, discussion will be made on the reason why the ratio between the density of the dot centers 721 for one color component (hereinafter, referred to as "reference density") and the density of the dot centers 721 for the other one color component (hereinafter, referred to as "changed density") is set about 1:0.7. As discussed above, if the dot centers 721 are arranged almost uniformly in a random fashion, the characteristic of spatial frequency of halftone dots appears almost like a ring. At this time, though not shown in FIGS. 10A and 10B, inside the ring-like area, there slightly appears rings of frequency which are the reciprocals of integer times the main frequency. Therefore, when a value which is the reciprocal of integer times the reference density of the dot centers 721 for one color component is equal to the changed density of the dot centers 721 for the other one color component, any one of a plurality of concentric ring-like areas representing the characteristic of spatial frequency for one color component overlaps the ring-like area representing the characteristic of spatial frequency for the other one color component. As a result, for the same reason as in the case of FIG. 10A, there arises graininess in the halftone dot image obtained by superposition.

In this case, it is not preferable to reduce the spatial frequency of the halftone dots for the other one color component to lower than half the spatial frequency of the halftone dots for one color component, in other words, to reduce the changed density of the dot centers 721 to lower than half the reference density of the dot centers 721, since the resolving powers of the halftone dot image largely vary by color components. Therefore, it is needed at minimum to arrange the dot centers 721 for the other one color component at the changed density lower than the reference density and higher than half the reference density. In a case of exchanging the reference density and the changed density, it is needed to arrange the dot centers 721 for the other one color component at the changed density higher than the reference density and lower than twice the reference density. The most preferable changed density of the dot centers 721 is 0.75 times the reference density or 1.5 times. Actually, it is preferable to adopt the changed density which is 0.6 to 0.9 times the reference density or 1.1 to 1.9 times the reference density, and further preferable to adopt the changed density which is 0.7 to 0.8 times the reference density (which corresponds to about 0.7 times in the above discussion) or 1.2 to 1.8 times the reference density.

Though the above discussion has been made on the halftone dots which represent gray levels by changing the size of dots arranged in a random fashion, the method of changing the density of the dot centers 721 for at least one color component can be also applied to the FM halftone dots.

Figure 11A:
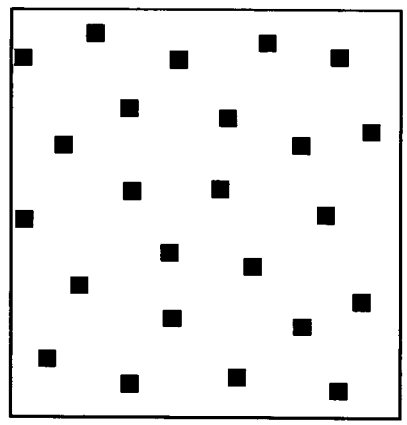
FIGS. 11A and 11B are views each showing an FM halftone dot image of one color component.
Figure 11B:
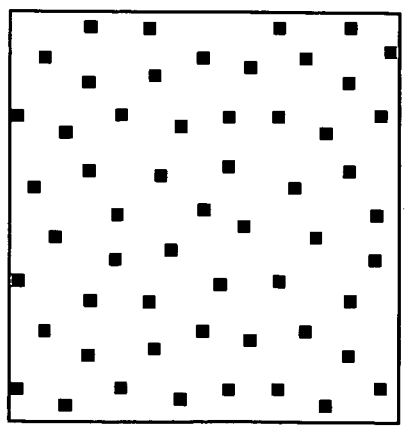

In the FM halftone dots, grayscale representation is made by changing the number of dots, i.e., the density in the number of dots, instead of changing the size of dot. Therefore, in a case of representing the same gray level, as shown in FIGS. 11A and 11B, by creating the halftone dots having different densities in the number of dots, it is possible to reduce graininess in the multicolor halftone dot image for the same reason discussed referring to FIG. 10B if the original image has a uniform gray level. The method of changing the density in the number of dot centers 721 by color components in each gray level can be also applied to halftone dots used to represent gray levels while changing not only the size of dots which grow around the dot centers 721 arranged in a random fashion but also the density in the number of dots (combination of the AM halftone dots and the FM halftone dots), like the FM halftone dots.

In other words, the technique for changing the density in the number of dots for at least one color component can be widely used for various halftone dot images in which the density in the number of dots arranged in a random fashion or (and) the size of dots in accordance with the gray level of the original image, and in creating the halftone dot images, first, a step for creating a first halftone dot image of one color component is performed (which corresponds to the first execution of Steps S16 to S19 in FIG. 4) and next a step for creating a second halftone dot image of the other one color component is performed (which corresponds to the second execution of Steps S16 to S19), and in this case, it is needed in each gray level that the density in the number of dots in the second halftone dot image should be lower than the density in the number of dots in the first halftone dot image and higher than half the density or higher than the density in the first halftone dot image and lower than twice the density (preferably, not lower than 0.6 times the density in the first halftone dot image and not higher than 0.9 times the density or not lower than 1.1 times the density in the first halftone dot image and not higher than 1.9 times the density, and more preferably, not lower than 0.7 times the density in the first halftone dot image and not higher than 0.8 times the density or not lower than 1.2 times the density in the first halftone dot image and not higher than 1.8 times the density).

Figure 12:
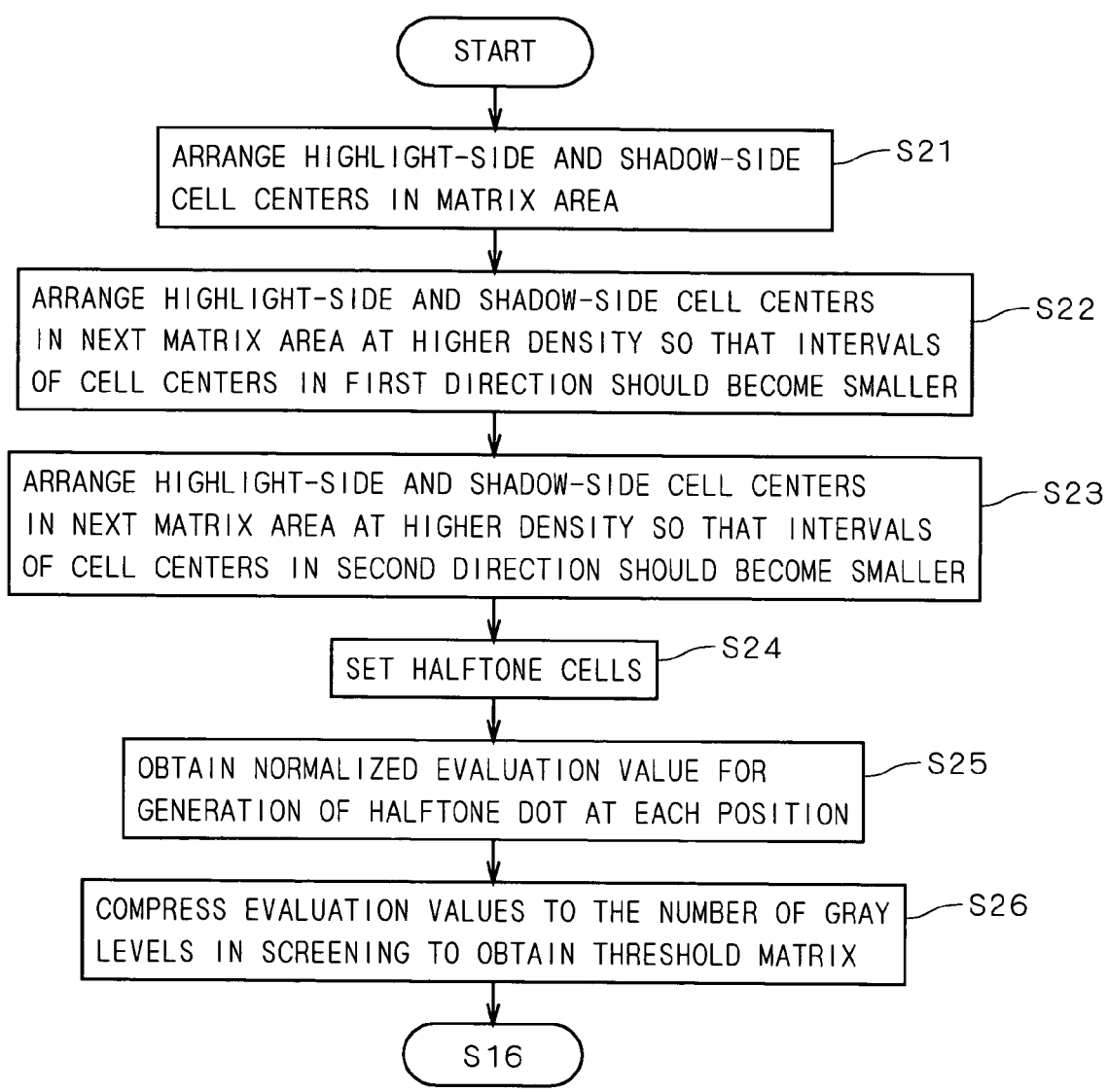
FIG. 12 is a flowchart showing another operation flow of the image recording system.

FIG. 12 is a flowchart showing another operation flow of the image recording system 1. This flowchart shows generation of the threshold matrix, which corresponds to Steps S11 to S16 in FIG. 4. FIG. 12 shows the operation flow for generation of the threshold matrixes for three color components, and in the operation flow, Steps S21, S22 and S23 are steps corresponding to the operations for these three color components, respectively, and Steps S24 to S26 are steps which are performed commonly for these three color components. Steps S21, S22 and S23 may be performed in this order as shown in FIG. 12 or may be performed in parallel. Steps S24 to S26 may be performed separately or the order of the steps in FIG. 12 may be changed as appropriate within the extent practical. Hereafter, first, generation of the threshold matrix for one color component (black) (Steps S21, S24 to S26) will be discussed and after that, generation of the threshold matrixes for the other two color components (cyan and magenta) (Steps S22, S24 to S26 and Steps S23, S24 to S26) will be discussed.

Figure 13:
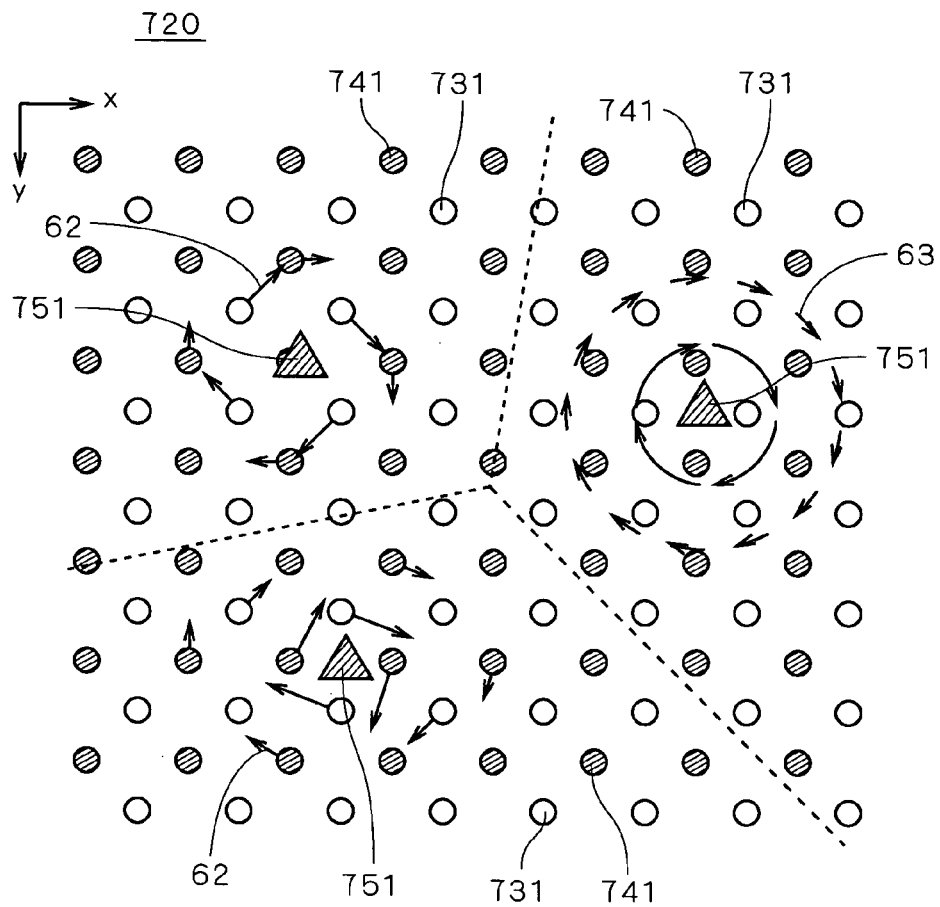
FIG. 13 is a view showing reference points superposed on cell centers arranged in the matrix area.

In generation of the threshold matrix 710, first, a matrix area for storing the threshold matrix 710 for black is set and centers of halftone cells (seeds, hereinafter, referred to as "cell centers") each serving as a unit of an area for forming the halftone dots in the matrix area are regularly arranged. At this time, it is intended to provide highlight-side halftone cells whose dot-like halftone dot areas vary in response to variation in highlight-side gray level of the original image (herein, in creating the halftone dots of the original image having a uniform value of pixels, the gray level corresponds to the quantity of the value) and shadow-side halftone cells whose mesh-like halftone dot areas vary in response to variation in shadow-side gray level (in other words, white dots are changed), and in the matrix area 720, as shown in FIG. 13, a plurality of highlight-side cell centers 731 and a plurality of shadow-side cell centers 741 are regularly arranged at the same pitch both in the row direction and the column direction.

Subsequently, reference points 751 are set in the matrix area 720 almost uniformly in a random fashion by a predetermined method, the number of which are sufficiently smaller than the number of cell centers 731 and 741. At this time, since the matrix area 720 corresponds to the repeat area 71 shown in FIG. 3, each of the reference points 751 is thought to repeat both in the horizontal and vertical directions. Then, the nearest reference point 751 is specified in consideration of repeat of the matrix area 720 with respect to each of the cell centers included in a plurality of highlight-side cell centers 731 and a plurality of shadow-side cell centers 741. FIG. 13 shows that the reference point 751 included in each of areas which are partitioned by broken lines is specified as the nearest one with respect to the cell centers 731 and 741 included in the same area, and each area may be thought as a territory of the reference point 751 included in the area.

The computer 11 calculates the distance between each of the cell centers 731 and 741 and the nearest reference point 751 (in consideration of repeat of the matrix area 720). Then, a rotation angle with respect to each of the cell centers 731 and 741 is obtained by a predetermined calculation, and the cell centers 731 and 741 are rotated around the nearest reference point 751 in the same rotating direction, to give fluctuation to the arrangement of the cell centers 731 and 741. At this time, the rotation angle with respect to each of the cell centers 731 and 741 becomes smaller as the distance between the one of the cell centers 731 and 741 and the nearest reference point 751 is longer. In the upper left and lower left areas of FIG. 13, shorter arrows 62 which are farther from the reference point 751 indicate that the rotation angle with respect to each of the cell centers 731 and 741 becomes smaller as the distance between the cell center and the nearest reference point 751 is longer. In the upper right area, arrows 63 conceptually indicate that the rotation angle of each cell center becomes smaller as the distance between the cell center and the reference point 751 is longer.

Subsequently, uniformity in distribution of a plurality of highlight-side cell centers 731 and a plurality of shadow-side cell centers 741 in the matrix area 720 is improved by utilizing the division of a Voronoi area and the movement of the cell centers to the barycenters of the division areas as necessary. With the above operation, setting of the cell centers 731 and 741 for black in the matrix area 720 almost uniformly in a random fashion is completed (Step S21).

The interval of the cell centers 731 and that of the cell centers 741 are each almost isotropic, cell centers 741 are arranged among cell centers 731 and the respective densities are 210 lines (in other words, a pair of cell centers 731 and 741 correspond to one dot center 721 in FIG. 5). Though arrangement of the highlight-side cell centers 731 and that of the shadow-side cell centers 741 are performed at the same time in the above operation, the arrangement of the cell centers 731 and that of the cell centers 741 may be performed separately. In other words, the above operation is practically a combination of the step of arranging a plurality of highlight-side cell centers 731 which are used as base points for generation of the threshold matrix in the matrix area 720 almost in a random fashion at a predetermined density and the step of arranging a plurality of shadow-side cell centers 741 which are used as interpolation points for the cell centers 731 among the cell centers 731 almost in a random fashion at the same density.

Thus, for separate setting of the highlight-side cell centers 731 and the shadow-side cell centers 741 used is, for example, a method of determining the positions of the highlight-side cell centers 731 like the dot centers 721 in FIG. 5 and then determining the positions of the shadow-side cell centers 741 by moving all the cell centers 731 by half the average value of the distance between the adjacent cell centers 731 in a predetermined direction.

Figure 14:
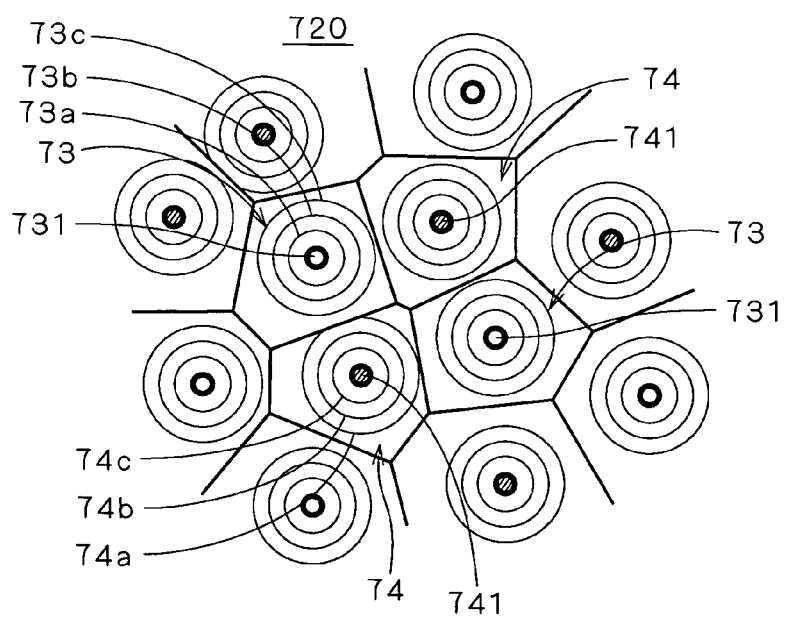
FIG. 14 is a view showing a state where halftone cells are set.

After setting of the cell centers 731 and 741 which are distributed almost uniformly, next, setting of the halftone cells each serving as a unit of creation of the halftone dot in the matrix area 720 around the cell centers 731 and 741 (Step S24). The setting of the halftone cells is the same as the case of FIG. 6 except for replacing the dot centers 721 of FIG. 6 with the cell centers 731 and 741. FIG. 14 is a view showing a state where the polygonal halftone cells 73 and 74 are set around the cell centers 731 and 741, respectively, and in this figure, the highlight-side halftone cell 73 is set correspondingly to the highlight-side cell center 731 and the shadow-side halftone cell 74 is set correspondingly to the shadow-side cell center 741. The halftone cells 73 and 74 are set in the matrix area 720 randomly in an irregular form in consideration of repeat of the matrix area 720 in the horizontal and vertical directions.

After setting of the halftone cells 73 and 74, subsequently, like the case of FIG. 6, the distance between each of all the positions in the halftone cell 73 or 74 and the cell center 731 or 741 of the halftone cell 73 or 74 including the position is obtained as the first-stage evaluation value. Then, numbers of integer which increase by 1 are sequentially assigned to all the positions in the halftone cell 73 or 74, from one having the smallest first-stage evaluation value, and the number is divided by the total number of positions constituting the halftone cell 73 or 74, to obtain the second-stage evaluation value (ranging from 0.0 to 1.0) which is normalized by the size of the halftone cell, which is now assigned. This allows a smaller evaluation value to be assigned to a position closer to the cell center 731 or 741.

Next, with respect to each of the shadow-side halftone cells 74, the second-stage evaluation value is changed to a value obtained by subtracting the second-stage evaluation value from 2. This gives evaluation values each ranging from 2.0 to 1.0 to the positions of the shadow-side halftone cells 74, and the second-stage evaluation value becomes larger as the position is closer to the shadow-side cell center 741. As a result, the normalized second-stage evaluation values each ranging from 0 to 2.0 are assigned to the positions of all the halftone cells (Step S25). Then, numbers of integer which increase by 1 are sequentially assigned all the positions in the matrix area 720, from one having the smallest second-stage evaluation value, and the numbers of order that a pixel in the halftone dot image corresponding to a position in the matrix area 720 is included in the halftone dot area in accordance with an increase in gray level of the original image are set to all the positions in the matrix area 720. In the matrix area 720 with the numbers of order, if the total number of positions is N, the numbers of order each of which is changed to a value within a range from 0 to (N−1) are assigned to all the positions as threshold values (Step S26).

FIG. 14 showing the halftone cells 73 and 74 in the matrix area 720 also illustrates the change in size of the halftone dot area formed in the halftone cells 73 or 74 in accordance with variation in gray level of the original image, and with the above setting of the threshold values, in the highlight-side halftone cells 73, the dot-like halftone dot areas grow from the cell centers 731 (base points) towards the peripheries in the halftone dot image as indicated by lines 73a to 73c in accordance with an increase in gray level on the highlight side of the original image, and the dots are connected to form a mesh, and in the shadow-side halftone cells 74, the halftone dot area grows from the peripheries towards the cell centers 741 (interpolation points) (the white dots are degenerated) as indicated by lines 74a to 74c in accordance with an increase in gray level on the shadow side of the original image.

In FIG. 14, since the first-stage evaluation value for each position is obtained as the distance between the position and the cell center 731 or 741, the boundary of halftone dot areas indicated by each of the lines 73a to 73c or 74a to 74c has a circular shape (perfect circle). As for the halftone cell 73 or 74, however, since the halftone dot area does not extend beyond the corresponding halftone cell 73 or 74, each halftone dot area varies in the matrix area 720 in accordance with the shape of the halftone cell 73 or 74 with variation in gray level.

Since the highlight-side cell center 731 is a center of a dot which grows when the gray level on the highlight side increases, however, it is thought to correspond to the dot center 721 in FIG. 6, and the density of the dot center 721 and that of the cell center 731 are equal to each other in the same screen ruling. The shape of boundary of the halftone dot area is not limited to a circle but may be a shape in conformance with the shape of the halftone dot area shown in FIG. 7B or 7C.

Figure 15:
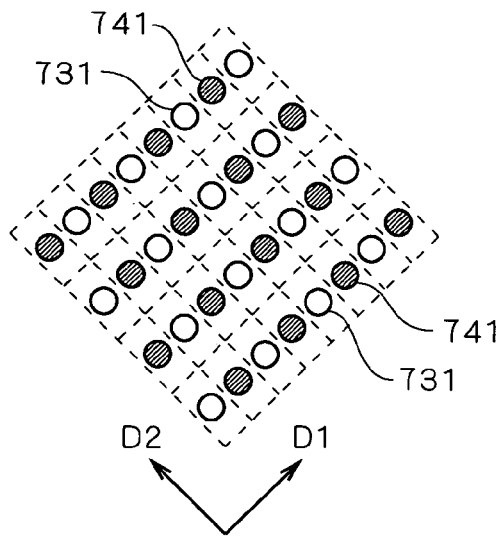
FIG. 15 is a view showing another arrangement of cell centers.
Figure 16:
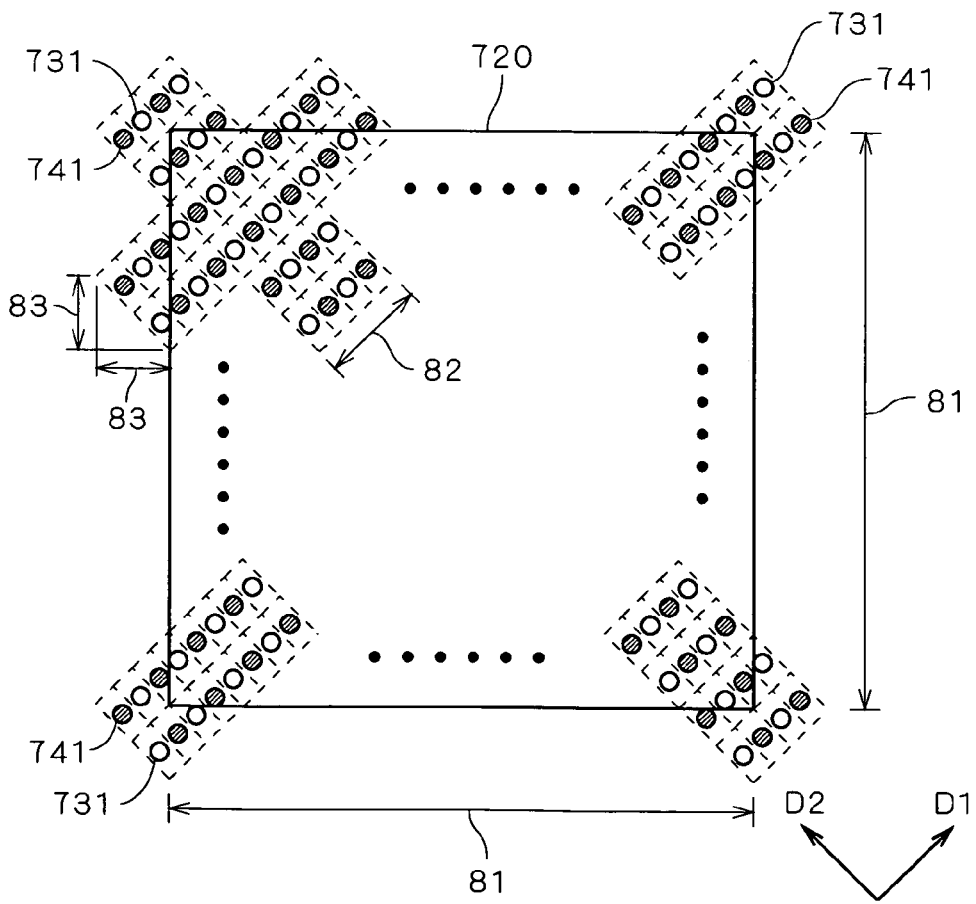
FIG. 16 is a view showing cell centers arranged in the matrix area.

Next, discussion will be made on generation of the threshold matrix 710 for cyan (Steps S22, S24 to S26). After the matrix area for cyan is set by the computer 11, the highlight-side cell centers 731 and the shadow-side cell centers 741 are arranged alternately in two directions, i.e., D1 (a first direction) and D2 (a second direction), which are orthogonal to each other as shown in FIG. 15. At this time, the cell centers 731 and 741 are arranged in a right-upward direction (a counterclockwise direction at an angle of 45 degrees from the right-horizontal direction) indicated by the arrow D1 of FIG. 15 at certain intervals shorter than the intervals in a left-upward direction (a counterclockwise direction at an angle of 135 degrees from the right-horizontal direction) indicated by the arrow D2, and the density of the cell centers 731 is set so that the screen ruling should be 300 lines. FIG. 16 is a view showing a specific case where the cell centers 731 and 741 are arranged in the matrix area 720. In plate making with 300 line screen and resolution of 2400 dpi, the number of positions set in the matrix area 720 (the positions correspond to pixels in the halftone dot image and hereinafter, the number is referred to also as "the number of pixels") is 1131 within a range defined by reference numeral 81 in FIG. 16 both in the horizontal and vertical directions, and the distance indicated by reference numeral 82 (twice the pitch of the cell centers 731 in the direction D1 and equal to the pitch of the cell centers 731 in the direction D2) is 16 pixels (the square root of an area occupied by four pairs of cell centers 731 and 741 (=64×4)). Therefore, the distance indicated by reference numeral 83 which is twice the horizontal or vertical distance between the cell centers 731 and 741 arranged in the direction D2 is 11.31 pixels.

Subsequently, like in the case of black, reference points 751 (see FIG. 13) are arranged in the matrix area 720 almost uniformly in a random fashion, the number of which are sufficiently smaller than the number of cell centers 731 and 741 arranged in the direction D2, and the nearest reference point 751 is specified in consideration of repeat of the matrix area 720 with respect to each of the cell centers. The cell centers 731 and 741 are rotated around the nearest reference point 751 in the same rotating direction, and the rotation angle with respect to each of the cell centers 731 and 741 becomes smaller as the distance between the one of the cell centers 731 and 741 and the nearest reference point 751 is longer. With the above operation, a plurality of cell centers 731 are arranged in the matrix area 720 almost uniformly in a random fashion so that an average of intervals of the cell centers 731 should become smallest in the direction D1 and become largest in the direction D2 orthogonal to the direction D1. A plurality of cell centers 741 are also arranged in the same manner (Step S22).

With the above operation, the intervals of the cell centers 731 and those of the cell centers 741 each have directivity (anisotropic property), and cell centers 741 are arranged among the cell centers 731 and the respective densities are 300 lines. The arrangement of the cell centers 731 and that of the cell centers 741 may be performed separately, and the above operation is practically a combination of the step of arranging a plurality of highlight-side cell centers 731 which are used as base points for generation of the threshold matrix in the matrix area 720 almost in a random fashion at a density higher than that for black and the step of arranging a plurality of shadow-side cell centers 741 which are used as interpolation points for the cell centers 731 among the cell centers 731 almost in a random fashion at the same density.

Thus, for separate setting of the highlight-side cell centers 731 and the shadow-side cell centers 741 used is, for example, a method of determining the positions of the highlight-side cell centers 731 by reducing the arrangement to half in the direction D1 after arranging like in the case of FIG. 5 and then determining the positions of the shadow-side cell centers 741 by moving all the cell centers 731 by a certain distance in a predetermined direction.

After setting of the cell centers 731 and 741 which are distributed almost uniformly with directivity, setting of the halftone cells 73 and 74 around the cell centers 731 and 741 by the same method as the case for black (Step S24). Since the cell centers 731 and 741 are arranged in the direction D1 more densely than in the direction D2, the highlight-side and shadow-side halftone cells 73 and 74 each have a shape which is flatter in the direction D1, in other words, elongated in the direction D2 as shown in FIG. 17.

Subsequently, the distance (vector) between each of all the positions in the halftone cell 73 or 74 and the cell center 731 or 741 of the halftone cell 73 or 74 including the position is multiplied by 2 in the direction D1 to obtain the first-stage evaluation value. Then, numbers of integer which increase by 1 are sequentially assigned to all the positions in the halftone cell 73 or 74, from one having the smallest first-stage evaluation value, and the number is divided by the total number of positions constituting the halftone cell 73 or 74, to obtain the second-stage evaluation value (ranging from 0.0 to 1.0) which is normalized by the size of the halftone cell, which is now assigned. This allows almost equal second-stage evaluation values to be present in a shape of ellipse as shown in FIG. 17, and a smaller evaluation value to be assigned to a position closer to the cell center 731 or 741.

Next, with respect to each of the shadow-side halftone cells 74, the second-stage evaluation value is changed to a value obtained by subtracting the second-stage evaluation value from 2, and the normalized second-stage evaluation values each ranging from 0 to 2.0 are assigned to the positions of all the halftone cells (Step S25). Then, numbers of integer which increase by 1 are sequentially assigned all the positions in the matrix area 720, from one having the smallest second-stage evaluation value, and the numbers of order each of which is changed to a value within a range from 0 to (N−1) are assigned to all the positions as threshold values (Step S26).

Figure 17:
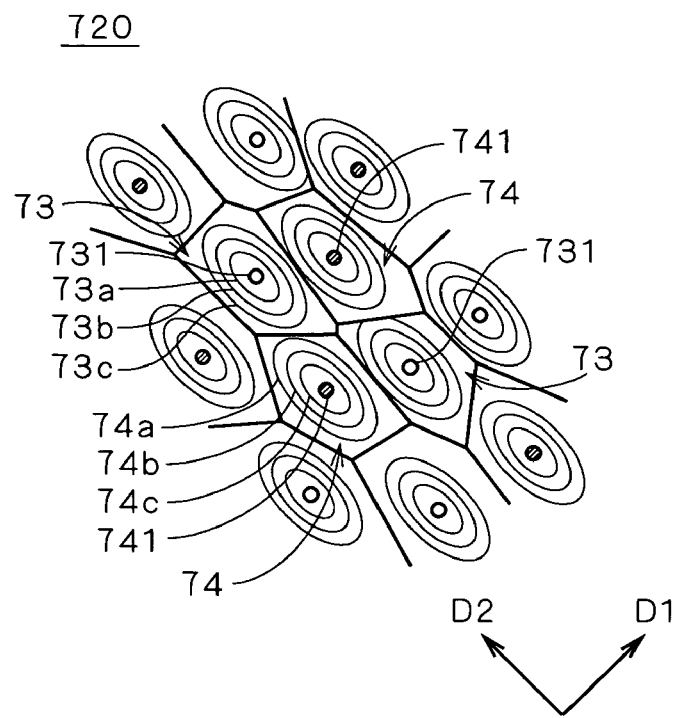
FIG. 17 is a view showing a state where the halftone cells are set.

Like FIG. 14, FIG. 17 also illustrates the change in size of the halftone dot area formed in the halftone cells 73 or 74 in accordance with variation in gray level of the original image, and with the above setting of the threshold values, in the highlight-side halftone cells 73, the dot-like elliptical halftone dot areas grow from the cell centers 731 (base points) towards the peripheries in the halftone dot image as indicated by lines 73a to 73c in accordance with an increase in gray level on the highlight side of the original image, and the dots are connected to form a mesh, and in the shadow-side halftone cells 74, the halftone dot area grows from the peripheries towards the cell centers 741 (interpolation points) (the white elliptical dots are degenerated) as indicated by lines 74a to 74c in accordance with an increase in gray level on the shadow side of the original image. Thus, in the matrix area 720, each halftone dot area varies in accordance with the shape of the halftone cells 73 or 74 with variation in gray level.

Figure 18:
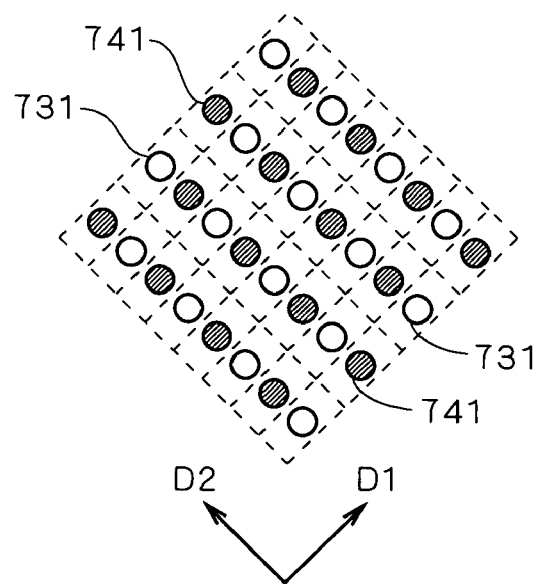
FIG. 18 is a view showing still another arrangement of cell centers.

Next, discussion will be made on generation of the threshold matrix 710 for magenta (Steps S23, S24 to S26). In the matrix area for magenta, as shown in FIG. 18, the highlight-side cell centers 731 and the shadow-side cell centers 741 are arranged alternately in two directions, i.e., D1 and D2 which are orthogonal to each other. At this time, the cell centers 731 and 741 are arranged in a left-upward direction indicated by the arrow D2 at certain intervals shorter than the intervals (half the intervals) in a right-upward direction indicated by the arrow D1, and the density of the cell centers 731 is set so that the screen ruling should be 300 lines, like in the case of cyan. In summary, the cell centers for magenta are arranged in such a manner that the arrangement of the cell centers for cyan is rotated at an angle of 90 degrees.

Subsequently, like in the case of cyan, setting of the reference points 751 and rotation of the cell centers 731 and 741 are performed (see FIG. 13), and thus a plurality of cell centers 731 are arranged in the matrix area 720 almost uniformly in a random fashion so that an average of intervals of the cell centers 731 should become smallest in the direction D2 and become largest in the direction D1. A plurality of cell centers 741 are also arranged in the same manner (Step S23). With the above operation, the intervals of the cell centers 731 and those of the cell centers 741 each have directivity different from that for cyan by 90 degrees, and cell centers 741 are arranged among the cell centers 731 and the respective densities are 300 lines. The arrangement of the cell centers 731 and that of the cell centers 741 may be performed separately, and the above operation is practically a combination of the step of arranging a plurality of highlight-side cell centers 731 which are used as base points for generation of the threshold matrix in the matrix area 720 almost in a random fashion at a density higher than that for black and the step of arranging a plurality of shadow-side cell centers 741 which are used as interpolation points for the cell centers 731 among the cell centers 731 almost in a random fashion at the same density.

After setting of the cell centers 731 and 741 which are distributed almost uniformly with directivity, setting of the halftone cells 73 and 74 around the cell centers 731 and 741 by the same method as the case for cyan (Step S24). Since the cell centers 731 and 741 are arranged in the direction D2 more densely than in the direction D1, the highlight-side and shadow-side halftone cells 73 and 74 each have a shape which is flatter in the direction D2, in other words, elongated in the direction D1.

Subsequently, the distance (vector) between each of all the positions in the halftone cell 73 or 74 and the cell center 731 or 741 of the halftone cell 73 or 74 including the position is multiplied by 2 in the direction D2 to obtain the first-stage evaluation value, and the first-stage evaluation value is normalized to obtain the second-stage evaluation value (ranging from 0.0 to 1.0), which is assigned to each of all the positions. This allows almost equal second-stage evaluation values to be present in a shape of ellipse like a reversed case of FIG. 17, and a smaller evaluation value to be assigned to a position closer to the cell center 731 or 741.

Next, with respect to each of the shadow-side halftone cells 74, the second-stage evaluation value is changed to a value obtained by subtracting the second-stage evaluation value from 2, and the normalized second-stage evaluation values are assigned to the positions of all the halftone cells (Step S25). Then, the numbers of order each of which is changed to a value within a range from 0 to (N−1) are assigned to all the positions in the matrix area 720 as threshold values (Step S26).

With the above setting of the threshold values, in the highlight-side halftone cells 73, the dot-like elliptical halftone dot areas grow from the cell centers 731 (base points) towards the peripheries in the halftone dot image in accordance with an increase in gray level on the highlight side of the original image, and the dots are connected to form a mesh, and in the shadow-side halftone cells 74, the halftone dot area grows from the peripheries towards the cell centers 741 (interpolation points) (the white elliptical dots are degenerated) in accordance with an increase in gray level on the shadow side of the original image. Thus, in the matrix area 720, each halftone dot area varies in accordance with the shape of the halftone cells 73 or 74 with variation in gray level.

Figure 19:
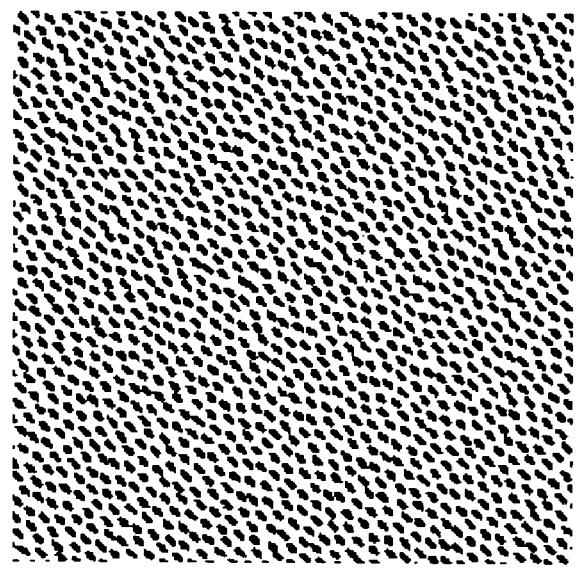
FIGS. 19 and 20 are views each showing a halftone tint image.
Figure 20:
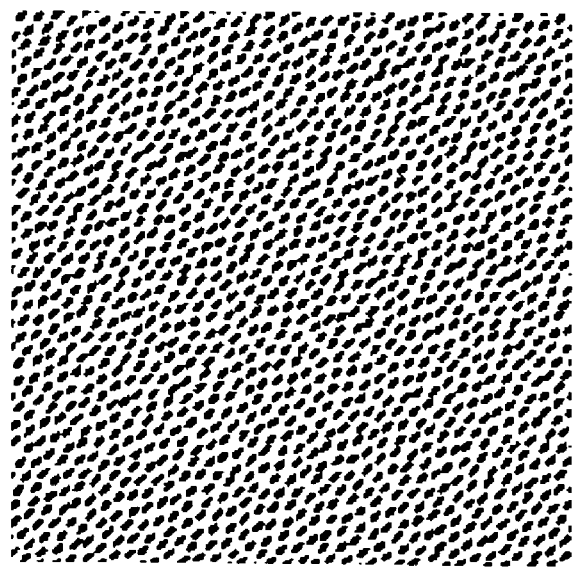

FIGS. 19 and 20 are views showing halftone tint images each having a uniform gray level of 30%, which are generated by using the threshold matrixes for cyan and magenta, respectively. As shown in FIG. 19, in the halftone tint image of cyan, the dots are elongated in a left-upward direction (direction D2), and as shown in FIG. 20, in the halftone tint image of magenta, the dots are elongated in a right-upward direction (direction D1). In other words, the density of a plurality of cell centers 731 in the halftone tint image of cyan and that of a plurality of cell centers 731 in the halftone tint image of magenta are almost equal to each other. In the halftone tint image of cyan, the intervals of a plurality of cell centers 731 are smallest in the direction D1 and the growth of a plurality of dots in accordance with an increase in gray level is smallest in the direction D1. In the halftone tint image of magenta, the intervals of a plurality of cell centers 731 are smallest in the direction D2 and the growth of a plurality of dots in accordance with an increase in gray level is smallest in the direction D2. Though not shown, however, the intervals of a plurality of cell centers 731 for black has almost isotropic property, the halftone dot density is 0.7 times that of cyan and magenta and the growth of a plurality of dots in accordance with an increase in gray level also has almost isotropic property.

When generation of the threshold matrixes for black, cyan and magenta is completed with the above operations, setting of the threshold matrix in the SPM 23 of FIG. 2 and recording of the halftone dot image on the printing plate 8 are sequentially performed by color components (FIG. 4: Steps S16 to S19).

Figure 21:
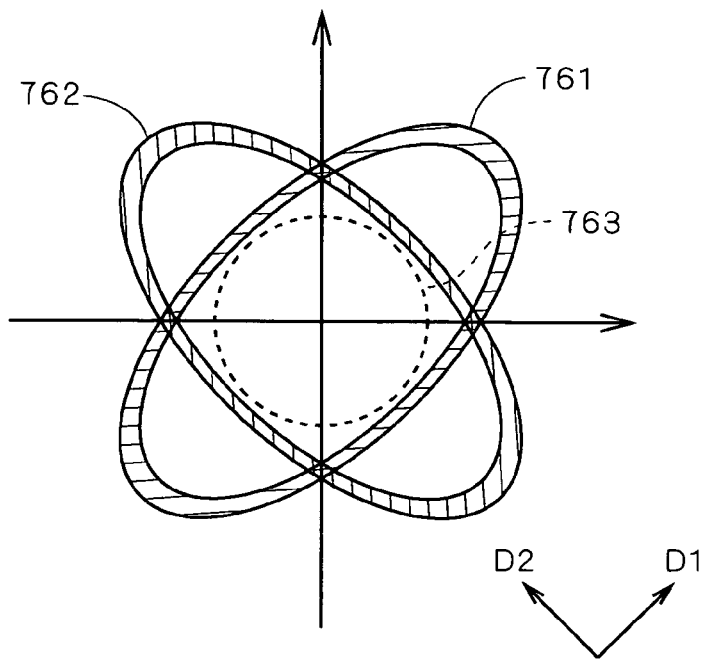
FIG. 21 is a view showing a characteristic of spatial frequency of halftone dots.

Next, discussion will be made on the characteristic feature of the halftone dot image created by the procedure of FIG. 12. In FIG. 21, reference numeral 761 represents the characteristic of spatial frequency (spectrum) of the halftone dot image of cyan and reference numeral 762 represents the characteristic of spatial frequency of the halftone dot image of magenta. As discussed earlier, in the threshold matrix for cyan, since the cell centers 731 and 741 are arranged at smaller intervals in the direction D1 and at larger intervals in the direction D2, higher values indicating periodicity are distributed in the elliptical ring-like area 761 which is elongated in the direction D1 in the frequency space. In the threshold matrix for magenta, since the cell centers 731 and 741 are arranged at smaller intervals in the direction D2 and at larger intervals in the direction D1, higher values indicating periodicity are distributed in the elliptical ring-like area 762 which is elongated in the direction D2 in the frequency space.

As a result, the directions where the respective periodicities approximate to each other in the halftone dot images of cyan and magenta are limited to intersections of the areas 761 and 762, and it is therefore possible to suppress an unpleasant low-frequency moire causing graininess in an image obtained by superposing the two halftone dot images. As for the halftone dot image of black, however, since it has almost isotropic property at low screen ruling, the characteristic of frequency appears in a small annular shape as indicated by the broken line 763 in FIG. 21. Since the directions where the characteristic of frequency for black approximates to those for cyan and magenta are partially present but are limited, both when the halftone dot images of black and cyan are superposed and when the halftone dot images of black and magenta are superposed, it is possible to suppress graininess in an image obtained by superposing these halftone dot images.

Thus, in the halftone dot image created by using the threshold matrixes generated through the procedure of FIG. 12, the density of the cell centers 731 (and cell centers 741) for black is different from both that of the cell centers 731 (and cell centers 741) for cyan and that of the cell centers 731 (and cell centers 741) for magenta, and this allows suppression of the graininess caused in the image obtained by superposing the halftone dot image of black and the halftone dot images of the other color components. Further, the direction where the intervals of the cell centers 731 for cyan are smaller is different from the direction where the intervals of the cell centers 731 for magenta are smaller, and this allows suppression of the graininess caused in the image obtained by superposing the halftone dot image of cyan and the halftone dot image of magenta. Thus, it is possible to suppress the graininess caused in the image obtained by superposing three colors.

The density of the cell centers 731 for black may be other than one that is 0.7 times the density of the cell centers 731 for cyan and magenta but, like in the case of FIG. 4, the density may be lower than the density for cyan and magenta and higher than half the density or higher than the density for cyan and magenta and lower than twice the density (preferably, not lower than 0.6 times the density for cyan and magenta and not higher than 0.9 times or not lower than 1.1 times the density for cyan and magenta and not higher than 1.9 times, more preferably, not lower than 0.7 times the density for cyan and magenta and not higher than 0.8 times or not lower than 1.2 times the density for cyan and magenta and not higher than 1.8 times). The density of the cell centers 731 for cyan and that for magenta are not necessarily equal to each other perfectly. Since it is not preferable that the densities for cyan and magenta should be greatly different from the density of the cell centers 731 for black, however, in an actual case, the densities of the cell centers 731 for cyan and magenta are made almost equal (so that the difference should not be higher than 30%).

Since the color component which affects most the contrast of the halftone dot image is black with high concentration, in order to reduce the halftone dot density for black for ensuring improvement of the printing stability and reduction of the swath pattern, it is preferable that the density of the cell centers 731 for black should be made lower than the density of the cell centers 731 for other color components (in other words, the density of the cell centers 731 for other color components should be higher than the density of the cell centers 731 for black and lower than the twice the density), and it is thereby possible to effectively suppress the graininess.

Figure 22:
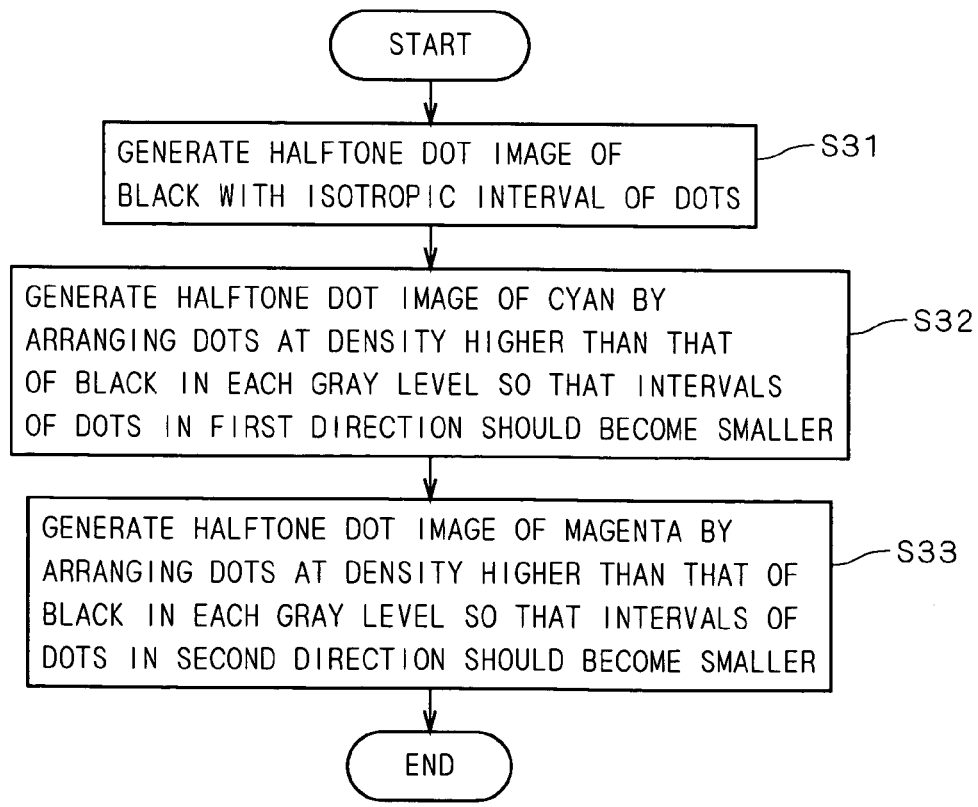
FIG. 22 is a flowchart showing an operation flow for generation of an FM halftone dot image.

Though the above discussion has been made on the halftone dots used to represent gray levels by changing the size of dots arranged in a random fashion, the above method where the density of the cell centers 731 (and cell centers 741) for at least one color component is different from the density of the cell centers 731 for another color component and if the densities of the cell centers 731 for a plurality of color components are equal, the directions where the intervals of the cell centers 731 are smaller are different by color components can be also applied to the FM halftone dots, and it is therefore possible to achieve reduction of graininess in the FM halftone dot image. FIG. 22 is a flowchart showing an operation flow for creation of such an FM halftone dot image, and in this procedure, the halftone dot images of black, cyan and magenta are created in this order (Steps S31 to S33).

If the original image has a predetermined uniform gray level, the halftone dot image created for black is the same as shown in FIG. 11B. Actually created is the halftone dot image of black in which the density in the number of dots arranged almost uniformly in a random fashion is changed in accordance with the gray level of the original image. In this case, the intervals of dots have almost isotropic property (Step S31).

Figure 23A:
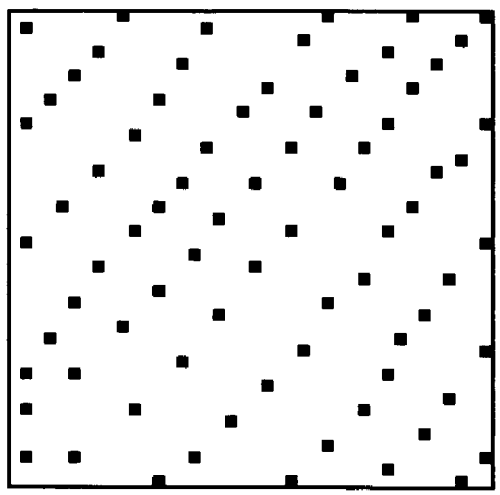
FIGS. 23A and 23B are views each showing an FM halftone dot image.
Figure 23A:
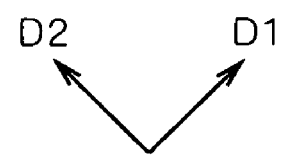

FIG. 23A is a view showing a halftone dot image created for cyan when the original image has a predetermined uniform gray level. Actually created is the halftone dot image of cyan in which the density in the number of dots arranged almost uniformly in a random fashion is changed in accordance with the gray level of the original image. In this case, for each gray level, the dots are arranged so that the density in the number of dots should be 1.3 times the density in the number of dots in the halftone dot image of black and the intervals of dots should be smallest in the direction D1 (the first direction) in FIG. 23A and largest in the direction D2 (the second direction) orthogonal to the direction D1 (Step S32).

Figure 23B:
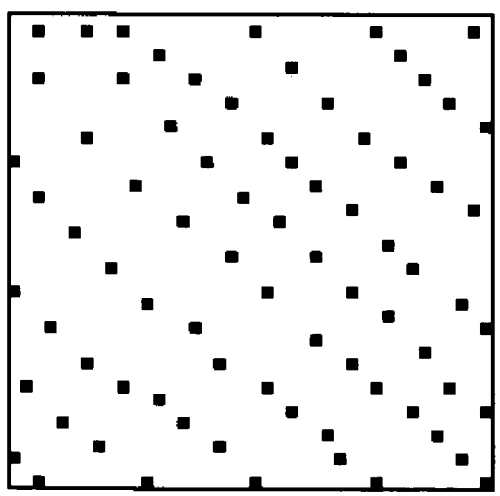
Figure 23B:
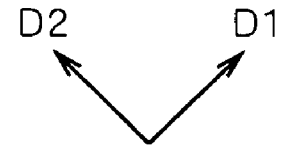

FIG. 23B is a view showing a halftone dot image created for magenta when the original image has a predetermined uniform gray level. Actually created is the halftone dot image of magenta in which the density in the number of dots arranged almost uniformly in a random fashion is changed in accordance with the gray level of the original image. In this case, like in the case of cyan, for each gray level, the dots are arranged so that the density in the number of dots should be 1.3 times the density in the number of dots in the halftone dot image of black and the intervals of dots should be smallest in the D2 in FIG. 23B and largest in the direction D1 (Step S33). Though The density in the number of dots for cyan and that for magenta are not necessarily equal to each other perfectly, however, in an actual case, these densities are made almost equal (so that the difference should not be higher than 30%).

Thus, also in creation of the FM halftone dot image, since the same as discussed on FIG. 21 is true on the characteristics of frequency in the halftone dot images of these color components if the original image has a uniform gray level, it is possible to reduce graininess in the halftone dot image obtained by superposing the halftone dot images of these colors. The operation for creating the FM halftone dot image shown in FIGS. 11A and 11B corresponds to execution of Step S32 with the intervals of dots having no directivity after execution of Step S31.

Like in the case of FIGS. 11A and 11B, also in the case of the FM halftone dot image, for each gray level in the original image, the density in the number of dots for one color component is lower than the density for other color components and higher than half the density or higher than the density for other color components and lower than twice the density (preferably, not lower than 0.6 times the density for other color components and not higher than 0.9 times or not lower than 1.1 times the density for other color components and not higher than 1.9 times, more preferably, not lower than 0.7 times the density for other color components and not higher than 0.8 times or not lower than 1.2 times the density for other color components and not higher than 1.8 times), and particularly, it is preferable that the density in the number of dots for black should be lower than the density in the number of dots for other color components. Further, the method of changing the density in the number of dot centers by color components in each gray level or arranging the dots with different anisotropic properties by color components can be also applied to halftone dots used to represent gray levels while changing not only the size of dots which grow around the dot centers (or cell centers) arranged in a random fashion but also the density in the number of dots (combination of the AM halftone dots and the FM halftone dots), like the FM halftone dots.

Though the preferred embodiment of the present invention has been discussed above, the present invention is not limited to the above-discussed preferred embodiment, but allows various variations.

Though the halftone cells are set in the matrix area and the threshold values are set in accordance with the shape of the halftone cell in the procedures of FIGS. 4 and 12, it is not necessary to explicitly perform the setting of the halftone cells. In generation of threshold matrix for each color component, generally, dot centers (which correspond to the dot centers 721 or the cell centers 731 in the above discussion and serve as base points for determination of the threshold values) are arranged in the matrix area almost in a random fashion and then the threshold values are set so that dot-like halftone dot areas should grow from a plurality of dot centers in a halftone dot image in accordance with an increase in gray level of the original image.

Though the dot centers 721 are arranged in the matrix area and the halftone dot areas grow from the dot centers 721 in accordance with an increase in gray level of the original image in FIG. 4 and the highlight-side cell centers 731 and the shadow-side cell centers 741 are arranged in the matrix area and the halftone dot areas grow from the cell centers 731 in accordance with an increase in gray level of the original image and the halftone dot areas increase towards the cell centers 741 in FIG. 12, the method of arranging the highlight-side and shadow-side cell centers for generation of a threshold matrix for each color component (FIG. 12: Steps S21, S24 to S26) may be adopted in the case of FIG. 4 and the method of arranging only the dot centers 721 for generation of a threshold matrix for each color component (Steps S11, S13 to S15) may be adopted in the case of FIG. 12. The method using the dot centers 721 has a merit of less amount of computation and the method of using two kinds of cell centers 731 and 741 has a merit of achieving symmetric change of the halftone dots on the highlight side and the shadow side.

Though the procedures of FIGS. 4 and 12 are executed on the premise that the threshold matrixes are generated and then the halftone dot image is created, the halftone dot image may be created, pursuant to the operation flow of FIG. 22 for generation of the FM halftone dot image, without generation of the threshold matrix, or without using the concept of the threshold matrix regardless of the presence or absence of the threshold matrix. In this case, creation of the halftone dot image in the operation of FIG. 4 is actually a combination of the step of creating a first halftone dot image in which the size of a plurality of dots for a first color component is changed around the first base points which correspond to the dot centers 721 arranged almost in a random fashion at a predetermined density in accordance with the gray level of the original image and the step of creating a second halftone dot image in which the size of a plurality of dots for a second color component is changed around the second base points which correspond to the dot centers 721 arranged almost in a random fashion at a density lower than the density of the first base points and higher half the density or higher than the density of the first base points and lower than twice the density (preferably, higher than 0.6 times the density of the first base points and lower than 0.9 times or higher than 1.1 times the density of the first base points and lower than 1.9 times) in accordance with the gray level of the original image.

Similarly, creation of the halftone dot image in the operation of FIG. 11 actually corresponds to a process where the dot centers 721 are replaced with the cell centers 731 in the above combination and to the combination step added is the step of creating a third halftone dot image in which the size of a plurality of dots for a third color component is changed around the third base points which correspond to the cell centers 731 arranged almost in a random fashion at a density lower than the density of the first base points and higher half the density or higher than the density of the first base points and lower than twice the density (preferably, higher than 0.6 times the density of the first base points and lower than 0.9 times or higher than 1.1 times the density of the first base points and lower than 1.9 times) in accordance with the gray level of the original image. In more detail, further, the process of creating the halftone dot image corresponds to the operation of FIG. 12, where the creation is performed so that the density of a plurality of second base points and the density of a plurality of third base points should be almost equal to each other, the intervals of a plurality of first base points should have almost isotropic property, the growth of a plurality of dots for the first color component in accordance with an increase of gray level should have almost isotropic property, the intervals of a plurality of second base points should be smallest in the direction D1, the growth of a plurality of dots for the second color component in accordance with an increase of gray level should be smallest in the direction D1, the intervals of a plurality of third base points should be smallest in the direction D2, and the growth of a plurality of dots for the third color component in accordance with an increase of gray level should be smallest in the direction D2.

Figure 24:
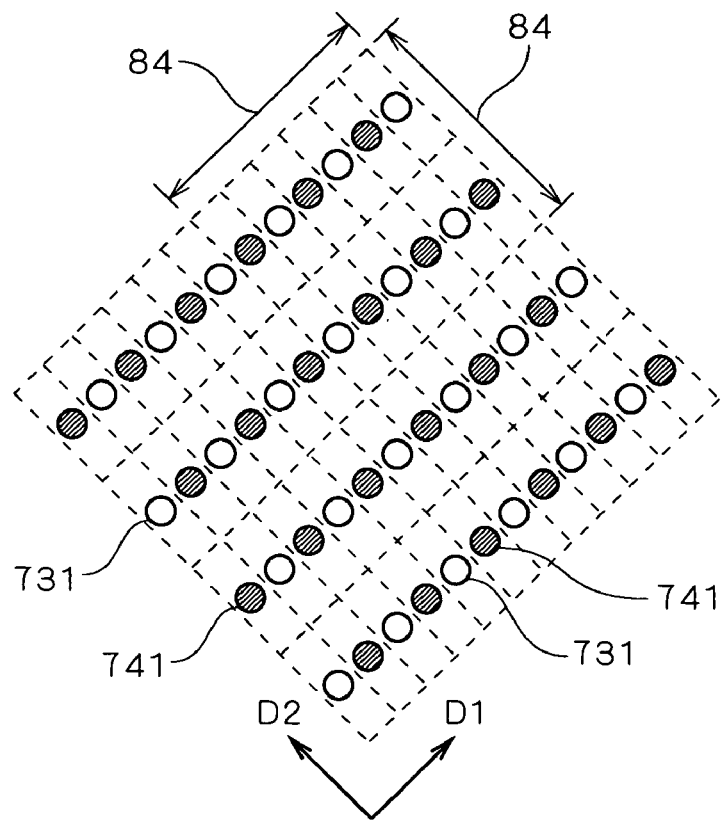
FIG. 24 is a view showing another arrangement of cell centers.

Initial arrangement of the highlight-side cell centers 731 and the shadow-side cell centers 741 shown in FIGS. 15 and 18 may be changed as appropriate, and for example, as shown in FIG. 24, the density of the cell centers in the direction D1 may be three times the density in the direction D2. In this case, for example, the distance indicated by reference numeral 84 in FIG. 24, is about 19.59 pixels (the square root of an area occupied by six pairs of cell centers 731 and 741 (=64×6)).

Though it is preferable that the directions where the intervals of the cell centers for two color components are shorter should be different from each other at an angle of 90 degrees in order to reduce the degree of overlap of spectra for the two color components as shown in FIG. 21, the angle is not necessarily limited to 90 degrees but it is important that the directivities for the two color components should be different.

The creation of the halftone dot image may be performed by software only with the computer 11 as discussed earlier and further, only the generation of the threshold matrixes 710 may be performed separately by software. In this case, the reader/writer 108 of FIG. 1 transmits the data of the threshold matrixes 710 to the image recording apparatus 12 through the computer-readable recording medium 91 such as an optical disk or a magnetic disk, or a computer network.

The image recording apparatus 12 may be an electrophotographic printing apparatus which records halftone dots on a photosensitive drum while scanning multichannel light beams with respect to the photosensitive drum and prints the halftone dots on printing paper, or an ink-jet printing apparatus which records halftone dots on printing paper while scanning multichannel ink-jet nozzles with respect to the printing paper. In these cases, the photosensitive drum or the printing paper serves as a halftone dot recording medium.

Figure 25:
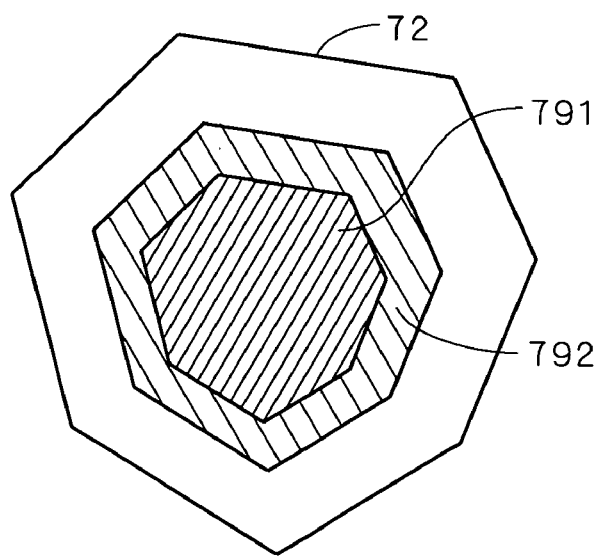
FIG. 25 is a view showing a multivalued halftone dot.

The technique for generation of the threshold matrixes 710 by changing the density of the dot centers 721 for at least one color component can be used in the ink-jet printing apparatus or a direct printing apparatus which records a multivalued halftone dot image other than the binary halftone dot image. In this case, a plurality of threshold matrixes having similar distributions and different average values of threshold values are obtained for each color component and the gray level of each pixel in the original image is compared with a plurality of threshold values from a plurality of threshold matrixes, to thereby determine which concentration (or color density) to be adopted in writing. With this operation, in the halftone cells 72 shown in FIG. 25, multiplex dots having a high-concentration area 791 at the center and a low-concentration area 792 around the area 791 are written, where the concentrations of the area 791, the area 792 and the other area are 1, 0.5 and 0, respectively. As a result, it is possible to achieve a multicolor halftone dot image with much less graininess.

In the image recording apparatus 12, when the recording stability is low in a case where writing is performed on only one pixel and not performed on the other pixels around this pixel, it is preferable that a plurality of threshold values near the dot center 721 in the threshold matrix 710 should be so corrected as to be equal values so that the minimum dot size (minimum cluster size) should be 2×2 pixels (or 1×2 pixels).

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2004-158595 filed in the Japan Patent Office on May 28, 2004, and Japanese Patent Application No. 2005-2777 filed in the Japan Patent Office on Jan. 7, 2005, the entire disclosure of which is incorporated herein by reference.

What is claimed is:

1. A method of generating a threshold matrix which is compared with an original image of gray scale for each color component in creating a halftone dot image which represents said original image, said threshold matrix for said each color component being generated in a matrix area for said each color component corresponding to each of repeat areas which are set by dividing said original image into areas having the same size in creating said halftone dot image, said halftone dot image being recorded on a recording medium in an image recording apparatus, comprising the steps of:

a1) arranging a plurality of first base points in a matrix area for a first color component in a random fashion at a predetermined density, said matrix area for said first color component being set in a memory;

a2) generating a threshold matrix for said first color component by setting threshold values in said matrix area for said first color component so that dot-like halftone dot areas grow from said plurality of first base points in a halftone dot image in accordance with an increase in gray level of a first original image;

b1) arranging a plurality of second base points in a matrix area for a second color component in a random fashion at a certain density higher than said predetermined density and lower than twice said predetermined density, said matrix area for said second color component being set in a memory; and b2) generating a threshold matrix for said second color component by setting threshold values in said matrix area for said second color component so that dot-like halftone dot areas grow from said plurality of second base points in a halftone dot image in accordance with an increase in gray level of a second original image, wherein said first color component is black and the size of each of said dot-like halftone dot areas for black is made larger than that for said second color component in the same gray level.

2. The method according to claim 1, wherein
said plurality of second base points are arranged in said matrix area for said second color component at a density not lower than 1.1 times said predetermined density and not higher than 1.9 times in said step b1).

3. The method according to claim 1, further comprising the steps of:
setting a plurality of first halftone cells around said plurality of first base points before said step a2); and
setting a plurality of second halftone cells around said plurality of second base points before said step b2),
wherein said threshold values in said step a2) are set so that halftone dot areas grow in accordance with the shape of said plurality of first halftone cells, and
said threshold values in said step b2) are set so that halftone dot areas grow in accordance with the shape of said plurality of second halftone cells.

4. The method according to claim 1, further comprising the steps of:
arranging a plurality of first interpolation points among said plurality of first base points, respectively, in said matrix area for said first color component in a random fashion at said predetermined density;
setting a plurality of first halftone cells around said plurality of first base points and said plurality of first interpolation points before said step a2);

arranging a plurality of second interpolation points among said plurality of second base points, respectively, in said matrix area for said second color component in a random fashion at said density of said plurality of second base points; and
setting a plurality of second halftone cells around said plurality of second base points and said plurality of second interpolation points before said step b2),
wherein said threshold values in said step a2) are set so that dot-like halftone dot areas grow from said plurality of first base points in a halftone dot image in accordance with the shape of said plurality of first halftone cells with an increase in gray level of said first original image, to form a mesh with dots connected, and further grow towards said plurality of first interpolation points, and
said threshold values in said step b2) are set so that dot-like halftone dot areas grow from said plurality of second base points in a halftone dot image in accordance with the shape of said plurality of second halftone cells with an increase in gray level of said second original image, to form a mesh with dots connected, and further grow towards said plurality of second interpolation points.

5. The method according to claim 1, further comprising the steps of:
c1) arranging a plurality of third base points in a matrix area for a third color component in a random fashion at a certain density lower than said predetermined density and higher than half said predetermined density or higher than said predetermined density and lower than twice said predetermined density, said matrix area for said third color component being set in a memory; and
c2) generating a threshold matrix for said third color component by setting threshold values in said matrix area for said third color component so that dot-like halftone dot areas grow from said plurality of third base points in a halftone dot image in accordance with an increase in gray level of a third original image.

6. The method according to claim 5, wherein
said plurality of third base points are arranged in said matrix area for said third color component at a density not lower than 0.6 times said predetermined density and not higher than 0.9 times or not lower than 1.1 times said predetermined density and not higher than 1.9 times in said step c1).

7. The method according to claim 5, wherein
said density of said plurality of second base points and said density of said plurality of third base points are equal to each other, and
the distribution of said plurality of first base points is such that an average of the intervals is constant in any direction, the distribution of said plurality of second base points is such that an average of the intervals is smallest in a first direction and the distribution of said plurality of third base points is such that an average of the intervals is smallest in a second direction different from said first direction.

8. The method according to claim 7, wherein
said first direction and said second direction are different from each other at an angle of 90 degrees.

9. The method according to claim 5, further comprising the steps of:
setting a plurality of first halftone cells around said plurality of first base points before said step a2);
setting a plurality of second halftone cells around said plurality of second base points before said step b2); and
setting a plurality of third halftone cells around said plurality of third base points before said step c2), wherein said threshold values in said step a2) are set so that halftone dot areas grow in accordance with the shape of said plurality of first halftone cells, said threshold values in said step b2) are set so that halftone dot areas grow in accordance with the shape of said plurality of second halftone cells, and said threshold values in said step c2) are set so that halftone dot areas grow in accordance with the shape of said plurality of third halftone cells.

10. The method according to claim 5, further comprising the steps of:

arranging a plurality of first interpolation points among said plurality of first base points, respectively, in said matrix area for said first color component in a random fashion at said predetermined density;

setting a plurality of first halftone cells around said plurality of first base points and said plurality of first interpolation points before said step a2);

arranging a plurality of second interpolation points among said plurality of second base points, respectively, in said matrix area for said second color component in a random fashion at said density of said plurality of second base points;

setting a plurality of second halftone cells around said plurality of second base points and said plurality of second interpolation points before said step b2);

arranging a plurality of third interpolation points among said plurality of third base points, respectively, in said matrix area for said third color component in a random fashion at said density of said plurality of third base points; and setting a plurality of third halftone cells around said plurality of third base points and said plurality of third interpolation points before said step c2);

wherein said threshold values in said step a2) are set so that dot-like halftone dot areas grow from said plurality of first base points in a halftone dot image in accordance with the shape of said plurality of first halftone cells with an increase in gray level of said first original image, to form a mesh with dots connected, and further grow towards said plurality of first interpolation points, said threshold values in said step b2) are set so that dot-like halftone dot areas grow from said plurality of second base points in a halftone dot image in accordance with the shape of said plurality of second halftone cells with an increase in gray level of said second original image, to form a mesh with dots connected, and further grow towards said plurality of second interpolation points, and said threshold values in said step c2) are set so that dot-like halftone dot areas grow from said plurality of third base points in a halftone dot image in accordance with the shape of said plurality of third halftone cells with an increase in gray level of said third original image, to form a mesh with dots connected, and further grow towards said plurality of third interpolation points.

11. A method of creating a halftone dot image which represents an original image of gray scale, using a threshold matrix which is compared with said original image for each color component, said threshold matrix for said each color component being generated in a matrix area for said each color component corresponding to each of repeat areas which are set by dividing said original image into areas having the same size in creating said halftone dot image, said halftone dot image being recorded on a recording medium in an image recording apparatus, comprising the steps of:

a1) arranging a plurality of first base points in a matrix area for a first color component in a random fashion at a predetermined density, said matrix area for said first color component being set in a memory;

a2) generating a threshold matrix for said first color component by setting threshold values in said matrix area for said first color component so that dot-like halftone dot areas grow from said plurality of first base points in a halftone dot image in accordance with an increase in gray level of a first original image;

b1) arranging a plurality of second base points in a matrix area for a second color component in a random fashion at a certain density higher than said predetermined density and lower than twice said predetermined density, said matrix area for said second color component being set in a memory;

b2) generating a threshold matrix for said second color component by setting threshold values in said matrix area for said second color component so that dot-like halftone dot areas grow from said plurality of second base points in a halftone dot image in accordance with an increase in gray level of a second original image;

a3) creating a halftone dot image of said first color component by comparing said threshold matrix for said first color component with said first original image, said halftone dot image of said first color component being output to—a recording mechanism in said image recording apparatus; and b3) creating a halftone dot image of said second color component by comparing said threshold matrix for said second color component with said second original image, said halftone dot image of said second color component being output to said recording mechanism, wherein said first color component is black and the size of each of said dot-like halftone dot areas for black is made larger than that for said second color component in the same gray level.

12. The method according to claim 11, further comprising the steps of:

c1) arranging a plurality of third base points in a matrix area for a third color component in a random fashion at a certain density lower than said predetermined density and higher than half said predetermined density or higher than said predetermined density and lower than twice said predetermined density, said matrix area for said third color component being set in a memory;

c2) generating a threshold matrix for said third color component by setting threshold values in said matrix area for said third color component so that dot-like halftone dot areas grow from said plurality of third base points in a halftone dot image in accordance with an increase in gray level of a third original image; and c3) creating a halftone dot image of said third color component by comparing said threshold matrix for said third color component with said third original image, said halftone dot image of said third color component being output to said recording mechanism.

13. The method according to claim 12, wherein said density of said plurality of second base points and said density of said plurality of third base points are equal to each other, and the distribution of said plurality of first base points is such that an average of the intervals is constant in any direction, the distribution of said plurality of second base points is such that an average of the intervals is smallest in a first direction and the distribution of said plurality of third base points is such that an average of the intervals is smallest in a second direction different from said first direction.

14. An apparatus for creating a halftone dot image which represents an original image of gray scale, using a threshold matrix which is compared with said original image for each color component, said threshold matrix for said each color component being generated in a matrix area for said each color component corresponding to each of repeat areas which are set by dividing said original image into areas having the same size in creating said halftone dot image, comprising:
   means for generating a plurality of threshold matrixes corresponding to a plurality of color components, respectively; and
   means for creating a plurality of halftone dot images corresponding to said plurality of color components, respectively, by comparing said plurality of threshold matrixes with original images,
   wherein said means for generating said plurality of threshold matrixes executes the steps of:
   a1) arranging a plurality of first base points in a matrix area for a first color component in a random fashion at a predetermined density;
   a2) generating a threshold matrix for said first color component by setting threshold values in said matrix area for said first color component so that dot-like halftone dot areas grow from said plurality of first base points in a halftone dot image in accordance with an increase in gray level of a first original image;
   b1) arranging a plurality of second base points in a matrix area for a second color component in a random fashion at a certain density higher than said predetermined density and lower than twice said predetermined density; and
   b2) generating a threshold matrix for said second color component by setting threshold values in said matrix area for said second color component so that dot-like halftone dot areas grow from said plurality of second base points in a halftone dot image in accordance with an increase in gray level of a second original image, wherein
   said first color component is black and the size of each of said dot-like halftone dot areas for black is made larger than that for said second color component in the same gray level.

15. The apparatus according to claim 14, wherein
   said means for generating said plurality of threshold matrixes further executes the steps of:
   c1) arranging a plurality of third base points in a matrix area for a third color component in a random fashion at a certain density lower than said predetermined density and higher than half said predetermined density or higher than said predetermined density and lower than twice said predetermined density; and
   c2) generating a threshold matrix for said third color component by setting threshold values in said matrix area for said third color component so that dot-like halftone dot areas grow from said plurality of third base points in a halftone dot image in accordance with an increase in gray level of a third original image.

16. The apparatus according to claim 15, wherein
   said density of said plurality of second base points and said density of said plurality of third base points are equal to each other, and
   the distribution of said plurality of first base points is such that an average of the intervals is constant in any direction, the distribution of said plurality of second base points is such that an average of the intervals is smallest in a first direction and the distribution of said plurality of third base points is such that an average of the intervals is smallest in a second direction different from said first direction.

17. A halftone dot image creation method of creating a halftone dot image which represents an original image of gray level for each color component, said halftone dot image being recorded on a recording medium in an image recording apparatus, comprising the steps of:
   creating a first halftone dot image in which the size of a plurality of dots for a first color component is changed around a plurality of first base points arranged in a random fashion at a predetermined density, in accordance with the gray level of a first original image, said first halftone dot image being output to a recording mechanism in said image recording apparatus; and
   creating a second halftone dot image in which the size of a plurality of dots for a second color component is changed around a plurality of second base points arranged in a random fashion at a certain density higher than said predetermined density and lower than twice said predetermined density, in accordance with the gray level of a second original image, said second halftone dot image being output to said recording mechanism, wherein
   said first color component is black and the size of each of said plurality of dots for black is made larger than that for said second color component in the same gray level.

18. The method according to claim 17, further comprising the step of
   creating a third halftone dot image in which the size of a plurality of dots for a third color component is changed around a plurality of third base points arranged in a random fashion at a certain density lower than said predetermined density and higher than half said predetermined density or higher than said predetermined density and lower than twice said predetermined density, in accordance with the gray level of a third original image, said third halftone dot image being output to said recording mechanism.

19. The method according to claim 18, wherein
   said density of said plurality of second base points and said density of said plurality of third base points are equal to each other, and
   the distribution of said plurality of first base points is such that an average of the intervals is constant in any direction and the growth of said plurality of dots for said first color component in accordance with an increase in gray level is constant in any direction,
   the distribution of said plurality of second base points is such that an average of the intervals is smallest in a first direction and the growth of said plurality of dots for said second color component in accordance with an increase in gray level is smallest in said first direction, and
   the distribution of said plurality of third base points is such that an average of the intervals is smallest in a second direction different from said first direction and the growth of said plurality of dots for said third color component in accordance with an increase in gray level is smallest in said second direction.

20. A halftone dot image creation method of creating a halftone dot image which represents an original image of gray level for each color component, said halftone dot image being recorded on a recording medium in an image recording apparatus, comprising the steps of:

creating a first halftone dot image in which first density in the number of dots for a first color component which are arranged uniformly in a random fashion is changed in accordance with the gray level of a first original image, said first halftone dot image being output to a recording mechanism in said image recording apparatus; and creating a second halftone dot image in which second density in the number of dots for a second color component which are arranged uniformly in a random fashion is changed in accordance with the gray level of a second original image, said second halftone dot image being output to said recording mechanism, wherein said second density is higher than said first density and lower than twice said first density in each gray level, said first color component is black and the size of each of said dots for black is made larger than that for said second color component.

21. The method according to claim 20, further comprising the step of creating a third halftone dot image in which third density in the number of dots for a third color component which are arranged uniformly in a random fashion is changed in accordance with the gray level of a third original image, said third halftone dot image being output to said recording mechanism, wherein said third density is lower than said first density and higher than half said first density or higher than said first density and lower than twice said first density in each gray level.

22. The method according to claim 21, wherein said second density and said third density are equal to each other in each gray level, and the distribution of said dots for said first color component is such that an average of the intervals is constant in any direction, the distribution of said dots for said second color component is such that an average of the intervals is smallest in a first direction and the distribution of said dots for said third color component is such that an average of the intervals is smallest in a second direction different from said first direction.

23. A computer-readable recording medium carrying a program for causing a computer to generate threshold matrixes each of which is compared with an original image of gray scale for each color component in creating a halftone dot image which represents said original image, each of said threshold matrixes being generated in a matrix area for said each color component corresponding to each of repeat areas which are set by dividing said original image into areas having the same size in creating said halftone dot image, wherein execution of said program by a computer causes said computer to perform the steps of:

a1) arranging a plurality of first base points in a matrix area for a first color component in a random fashion at a predetermined density;

a2) generating a threshold matrix for said first color component by setting threshold values in said matrix area for said first color component so that dot-like halftone dot areas grow from said plurality of first base points in a halftone dot image in accordance with an increase in gray level of a first original image;

b1) arranging a plurality of second base points in a matrix area for a second color component in a random fashion at a certain density higher than said predetermined density and lower than twice said predetermined density; and b2) generating a threshold matrix for said second color component by setting threshold values in said matrix area for said second color component so that dot-like halftone dot areas grow from said plurality of second base points in a halftone dot image in accordance with an increase in gray level of a second original image, wherein said first color component is black and the size of each of said dot-like halftone dot areas for black is made larger than that for said second color component in the same gray level.

24. The recording medium according to claim 23, wherein execution of said program by a computer causes said computer to further perform the steps of:

c1) arranging a plurality of third base points in a matrix area for a third color component in a random fashion at a certain density lower than said predetermined density and higher than half said predetermined density or higher than said predetermined density and lower than twice said predetermined density; and c2) generating a threshold matrix for said third color component by setting threshold values in said matrix area for said third color component so that dot-like halftone dot areas grow from said plurality of third base points in a halftone dot image in accordance with an increase in gray level of a third original image.

25. The recording medium according to claim 24, wherein said density of said plurality of second base points and said density of said plurality of third base points are equal to each other, and the distribution of said plurality of first base points is such that an average of the intervals is constant in any direction, the distribution of said plurality of second base points is such that an average of the intervals is smallest in a first direction and the distribution of said plurality of third base points is such that an average of the intervals is smallest in a second direction different from said first direction.

26. A method of generating a threshold matrix which is compared with an original image of gray scale for each color component in creating a halftone dot image which represents said original image, said threshold matrix for said each color component being generated in a matrix area for said each color component corresponding to each of repeat areas which are set by dividing said original image into areas having the same size in creating said halftone dot image, said halftone dot image being recorded on a recording medium in an image recording apparatus, comprising the steps of:

a1) arranging a plurality of first base points in a matrix area for a first color component in a random fashion at a predetermined density, said matrix area for said first color component being set in a memory;

a2) generating a threshold matrix for said first color component by setting threshold values in said matrix area for said first color component so that dot-like halftone dot areas grow from said plurality of first base points in a halftone dot image in accordance with an increase in gray level of a first original image;

b1) arranging a plurality of second base points in a matrix area for a second color component in a random fashion at a certain density higher than said predetermined density and lower than twice said predetermined density, said matrix area for said second color component being set in a memory;

b2) generating a threshold matrix for said second color component by setting threshold values in said matrix area for said second color component so that dot-like halftone dot areas grow from said plurality of second base points in a halftone dot image in accordance with an increase in gray level of a second original image;

c1) arranging a plurality of third base points in a matrix area for a third color component in a random fashion at a density equal to said density of said plurality of second base points, said matrix area for said third color component being set in a memory; and c2) generating a threshold matrix for said third color component by setting threshold values in said matrix area for said third color component so that dot-like halftone dot areas grow from said plurality of third base points in a halftone dot image in accordance with an increase in gray level of a third original image, wherein said first color component is black and the size of each of said dot-like halftone dot areas for black is made larger than that for said second color component in the same gray level, the distribution of said plurality of first base points is such that an average of the intervals is constant in any direction, the distribution of said plurality of second base points is such that an average of the intervals is smallest in a first direction and thereby higher values indicating periodicity are distributed in an elliptical ring-like area which is elongated in said first direction in a frequency space, and the distribution of said plurality of third base points is such that an average of the intervals is smallest in a second direction different from said first direction and thereby higher values indicating periodicity are distributed in an elliptical ring-like area which is elongated in said second direction in said frequency space.

27. A method of creating a halftone dot image which represents an original image of gray scale, using a threshold matrix which is compared with said original image for each color component, said threshold matrix for said each color component being generated in a matrix area for said each color component corresponding to each of repeat areas which are set by dividing said original image into areas having the same size in creating said halftone dot image, said halftone dot image being recorded on a recording medium in an image recording apparatus, comprising the steps of:

a1) arranging a plurality of first base points in a matrix area for a first color component in a random fashion at a predetermined density, said matrix area for said first color component being set in a memory;

a2) generating a threshold matrix for said first color component by setting threshold values in said matrix area for said first color component so that dot-like halftone dot areas grow from said plurality of first base points in a halftone dot image in accordance with an increase in gray level of a first original image;

b1) arranging a plurality of second base points in a matrix area for a second color component in a random fashion at a density higher than said predetermined density and lower than twice said predetermined density, said matrix area for said second color component being set in a memory;

b2) generating a threshold matrix for said second color component by setting threshold values in said matrix area for said second color component so that dot-like halftone dot areas grow from said plurality of second base points in a halftone dot image in accordance with an increase in gray level of a second original image;

c1) arranging a plurality of third base points in a matrix area for a third color component in a random fashion at a density equal to said density of said plurality of second base points, said matrix area for said third color component being set in a memory;

c2) generating a threshold matrix for said third color component by setting threshold values in said matrix area for said third color component so that dot-like halftone dot areas grow from said plurality of third base points in a halftone dot image in accordance with an increase in gray level of a third original image;

a3) creating a halftone dot image of said first color component by comparing said threshold matrix for said first color component with said first original image, said halftone dot image of said first color component being output to a recording mechanism in said image recording apparatus;

b3) creating a halftone dot image of said second color component by comparing said threshold matrix for said second color component with said second original image, said halftone dot image of said second color component being output to said recording mechanism; and c3) creating a halftone dot image of said third color component by comparing said threshold matrix for said third color component with said third original image, said halftone dot image of said third color component being output to said recording mechanism, wherein said first color component is black and the size of each of said dot-like halftone dot areas for black is made larger than that for said second color component in the same gray level, the distribution of said plurality of first base points is such that an average of the intervals is constant in any direction, the distribution of said plurality of second base points is such that an average of the intervals is smallest in a first direction and thereby higher values indicating periodicity are distributed in an elliptical ring-like area which is elongated in said first direction in a frequency space, and the distribution of said plurality of third base points is such that an average of the intervals is smallest in a second direction different from said first direction and thereby higher values indicating periodicity are distributed in an elliptical ring-like area which is elongated in said second direction in said frequency space.

28. An apparatus for creating a halftone dot image which represents an original image of gray scale, using a threshold matrix which is compared with said original image for each color component, said threshold matrix for said each color component being generated in a matrix area for said each color component corresponding to each of repeat areas which are set by dividing said original image into areas having the same size in creating said halftone dot image, comprising:

means for generating a plurality of threshold matrixes corresponding to a plurality of color components, respectively, and means for creating a plurality of halftone dot images corresponding to said plurality of color components, respectively, by comparing said plurality of threshold matrixes with original images, wherein said means for generating said plurality of threshold matrixes executes the steps of:

a1) arranging a plurality of first base points in a matrix area for a first color component in a random fashion at a predetermined density;

a2) generating a threshold matrix for said first color component by setting threshold values in said matrix area for said first color component so that dot-like halftone dot areas grow from said plurality of first base points in a halftone dot image in accordance with an increase in gray level of a first original image;

b1) arranging a plurality of second base points in a matrix area for a second color component in a random fashion at a density higher than said predetermined density and lower than twice said predetermined density;

b2) generating a threshold matrix for said second color component by setting threshold values in said matrix area for said second color component so that dot-like halftone dot areas grow from said plurality of second base points in a halftone dot image in accordance with an increase in gray level of a second original image;

c1) arranging a plurality of third base points in a matrix area for a third color component in a random fashion at a density equal to said density of said plurality of second base points;

c2) generating a threshold matrix for said third color component by setting threshold values in said matrix area for said third color component so that dot-like halftone dot areas grow from said plurality of third base points in a halftone dot image in accordance with an increase in gray level of a third original image; and said first color component is black and the size of each of said dot-like halftone dot areas for black is made larger than that for said second color component in the same gray level, the distribution of said plurality of first base points is such that an average of the intervals is constant in any direction, the distribution of said plurality of second base points is such that an average of the intervals is smallest in a first direction and thereby higher values indicating periodicity are distributed in an elliptical ring-like area which is elongated in said first direction in a frequency space, and the distribution of said plurality of third base points is such that an average of the intervals is smallest in a second direction different from said first direction and thereby higher values indicating periodicity are distributed in an elliptical ring-like area which is elongated in said second direction in said frequency space.

29. A halftone dot image creation method of creating a halftone dot image which represents an original image of gray level for each color component, said halftone dot image being recorded on a recording medium in an image recording apparatus, comprising the steps of:

creating a first halftone dot image in which the size of a plurality of dots for a first color component is changed around a plurality of first base points arranged in a random fashion at a predetermined density, in accordance with the gray level of a first original image, said first halftone dot image being output to a recording mechanism in said image recording apparatus;

creating a second halftone dot image in which the size of a plurality of dots for a second color component is changed around a plurality of second base points arranged in a random fashion at a density higher than said predetermined density and lower than twice said predetermined density, in accordance with the gray level of a second original image, said second halftone dot image being output to said recording mechanism; and creating a third halftone dot image in which the size of a plurality of dots for a third color component is changed around a plurality of third base points arranged in a random fashion at a density equal to said density of said plurality of second base points, in accordance with the gray level of a third original image, said third halftone dot image being output to said recording mechanism, wherein said first color component is black and the size of each of said plurality of dots for black is made larger than that for said second color component in the same gray level, the distribution of said plurality of first base points is such that an average of the intervals is constant in any direction and the growth of said plurality of dots for said first color component in accordance with an increase in gray level is constant in any direction, the distribution of said plurality of second base points is such that an average of the intervals is smallest in a first direction and thereby higher values indicating periodicity are distributed in an elliptical ring-like area which is elongated in said first direction in a frequency space, and the growth of said plurality of dots for said second color component in accordance with an increase in gray level is smallest in said first direction, and the distribution of said plurality of third base points is such that an average of the intervals is smallest in a second direction different from said first direction and thereby higher values indicating periodicity are distributed in an elliptical ring-like area which is elongated in said second direction in said frequency space and the growth of said plurality of dots for said third color component in accordance with an increase in gray level is smallest in said second direction.

30. A halftone dot image creation method of creating a halftone dot image which represents an original image of gray level for each color component, said halftone dot image being recorded on a recording medium in an image recording apparatus, comprising the steps of:

creating a first halftone dot image in which first density in the number of dots for a first color component which are arranged uniformly in a random fashion is changed in accordance with the gray level of a first original image, said first halftone dot image being output to a recording mechanism in said image recording apparatus;

creating a second halftone dot image in which second density in the number of dots for a second color component which are arranged uniformly in a random fashion is changed in accordance with the gray level of a second original image, said second halftone dot image being output to said recording mechanism; and creating a third halftone dot image in which third density in the number of dots for a third color component which are arranged uniformly in a random fashion is changed in accordance with the gray level of a third original image, said third halftone dot image being output to said recording mechanism, wherein said second density is higher than said first density and lower than twice said first density in each gray level, said second density and said third density are equal to each other in each gray level, said first color component is black and the size of each of said dots for black is made larger than that for said second color component, the distribution of said dots for said first color component is such that an average of the intervals is constant in any direction, the distribution of said dots for said second color component is such that an average of the intervals is smallest in a first direction and thereby higher values indicating periodicity are distributed in an elliptical ring-like area which is elongated in said first direction in a frequency space, and the distribution of said dots for said third color component is such that an average of the intervals is smallest in a second direction different from said first direction and thereby higher values indicating periodicity are distributed in an elliptical ring-like area which is elongated in said second direction in said frequency space.

31. A computer-readable recording medium carrying a program for causing a computer to generate threshold matrixes each of which is compared with an original image of gray scale for each color component in creating a halftone dot image which represents said original image, each of said threshold matrixes being generated in a matrix area for said each color component corresponding to each of repeat areas which are set by dividing said original image into areas having the same size in creating said halftone dot image, wherein execution of said program by a computer causes said computer to perform the steps of:

a1) arranging a plurality of first base points in a matrix area for a first color component in a random fashion at a predetermined density;

a2) generating a threshold matrix for said first color component by setting threshold values in said matrix area for said first color component so that dot-like halftone dot areas grow from said plurality of first base points in a halftone dot image in accordance with an increase in gray level of a first original image;

b1) arranging a plurality of second base points in a matrix area for a second color component in a random fashion at a density higher than said predetermined density and lower than twice said predetermined density;

b2) generating a threshold matrix for said second color component by setting threshold values in said matrix area for said second color component so that dot-like halftone dot areas grow from said plurality of second base points in a halftone dot image in accordance with an increase in gray level of a second original image;

c1) arranging a plurality of third base points in a matrix area for a third color component in a random fashion at a density equal to said density of said plurality of second base points; and c2) generating a threshold matrix for said third color component by setting threshold values in said matrix area for said third color component so that dot-like halftone dot areas grow from said plurality of third base points in a halftone dot image in accordance with an increase in gray level of a third original image, wherein said first color component is black and the size of each of said dot-like halftone dot areas for black is made larger than that for said second color component in the same gray level, the distribution of said plurality of first base points is such that an average of the intervals is constant in any direction, the distribution of said plurality of second base points is such that an average of the intervals is smallest in a first direction and thereby higher values indicating periodicity are distributed in an elliptical ring-like area which is elongated in said first direction in a frequency space, and the distribution of said plurality of third base points is such that an average of the intervals is smallest in a second direction different from said first direction and thereby higher values indicating periodicity are distributed in an elliptical ring-like area which is elongated in said second direction in said frequency space.

* * * * *